(12) United States Patent
Fu et al.

(10) Patent No.: US 12,355,369 B2
(45) Date of Patent: Jul. 8, 2025

(54) DUAL-PURPOSE DRIVE AND CHARGER SYSTEMS AND METHODS THEREOF

(71) Applicant: Deere & Company, Moline, IL (US)

(72) Inventors: Tianjun Fu, Fargo, ND (US); Yuheng Wu, Fayetteville, AR (US); Long Wu, Fargo, ND (US); Danielle Li, Fargo, ND (US); Eric Vilar, Dubuque, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 17/392,540

(22) Filed: Aug. 3, 2021

(65) Prior Publication Data

US 2023/0038561 A1 Feb. 9, 2023

(51) Int. Cl.
| | |
|---|---|
| *H02M 7/797* | (2006.01) |
| *B60L 15/20* | (2006.01) |
| *B60L 53/24* | (2019.01) |
| *B60L 53/62* | (2019.01) |
| *H02J 7/00* | (2006.01) |
| *H02M 3/335* | (2006.01) |
| *H02P 27/08* | (2006.01) |

(52) U.S. Cl.
CPC ............. *H02M 7/797* (2013.01); *B60L 15/20* (2013.01); *B60L 53/24* (2019.02); *B60L 53/62* (2019.02); *H02J 7/0068* (2013.01); *H02J 7/00712* (2020.01); *H02M 3/33571* (2021.05); *H02P 27/08* (2013.01); *B60L 2210/10* (2013.01); *B60L 2210/30* (2013.01); *H02J 2207/20* (2020.01)

(58) Field of Classification Search
CPC ... H02M 7/797; H02M 3/33571; B60L 53/62; B60L 53/24; B60L 15/20; B60L 2210/10; B60L 2210/30; B02J 7/00712; H02J 7/0068; H02J 2207/20; H02P 27/08
USPC ................................................. 307/10.1, 9.1
See application file for complete search history.

(56) References Cited

U.S. PATENT DOCUMENTS

| | | | |
|---|---|---|---|
| 2008/0211471 A1 | 9/2008 | Liao et al. | |
| 2011/0025236 A1* | 2/2011 | Takizawa | H02M 1/32 307/77 |
| 2017/0227937 A1* | 8/2017 | Batliner | G01R 31/367 |

(Continued)

FOREIGN PATENT DOCUMENTS

| | | | |
|---|---|---|---|
| CN | 111064359 A | * 4/2020 | |
| CN | 111478572 B | * 2/2021 | H02M 1/4233 |

OTHER PUBLICATIONS

Soumya Ranjan Meher, Apr. 2020, IEEE Transactions on Vehicular Technology, vol. 69, No. 4, pp. 3760-3772.*

(Continued)

*Primary Examiner* — Rexford N Barnie
*Assistant Examiner* — Swarna N Chowdhuri
(74) *Attorney, Agent, or Firm* — Harness, Dickey & Pierce, P.L.C.

(57) ABSTRACT

In an example embodiment, a system includes an inverter configured to operate in at least one of a charging mode or a drive mode, a cascaded direct current (DC)-DC converter, the DC-DC converter including a first portion of the inverter and at least one controller configured to selectively couple the first portion of the inverter to a first portion of the cascaded DC-DC converter during the charging mode, and selectively couple the inverter to a second portion of the cascaded DC-DC converter during the drive mode.

17 Claims, 16 Drawing Sheets

(56) References Cited

U.S. PATENT DOCUMENTS

| | | | |
|---|---|---|---|
| 2018/0105059 A1* | 4/2018 | Namou | G01R 31/3271 |
| 2019/0061553 A1* | 2/2019 | Yang | B60L 58/22 |
| 2019/0363660 A1 | 11/2019 | Mao | |
| 2020/0207227 A1* | 7/2020 | Tan | H02J 7/02 |
| 2022/0029551 A1* | 1/2022 | Park | H02M 3/335 |

OTHER PUBLICATIONS

"The Discontinuous Conduction Mode" Origin of the Discontinuous Conduction Mode, and Mode Boundary, 5.1, pp. 107-130 Jan. 31, 2001.
X. Zhou et al. "High-Frequency Resonance Mitigation for Plug-In Hybrid Electric Vehicles' Integration With a Wide Range of Grid Conditions" IEEE Transactions on Power Electronics, vol. 27, No. 11, Nov. 2012, pp. 4459-4471.
S. Zhang et al. "A Unified Analytical Modeling of the Interleaved Pulse Width Modulation (PWM) DC-DC Converter and Its Applications" IEEE Transactions on Power Electronics, vol. 28, No. 11, Nov. 2013, pp. 5147-5158.
J.R. Pinheiro et al. "Isolated Interleaved-Phase-Shift-PMW dc-dc ZVS Converters" IEEE, copyright 2000, pp. 2383-2388.
T. Na et al. "A Review of on-Board Integrated Electric Vehicles Charger and a New Single-Phase Integrated Charger" CPSS Transactions on power electronics and applications, vol. 4, No. 4, Dec. 2019, pp. 288-298.
T. Na et al. "A Review of On-Board Integrated Charger for Electric Vehicles and A New Solution" National Natural Science Foundation of China, downloaded Apr. 20, 2021, pp. 693-699.
S. Ebrahimi et al. "A Single-Phase Integrated Bidirectional Plug-In Hybrid Electric Vehicle Battery Charger" IEEE copyright 2014, pp. 1137-1142.
J. Lim et al. "A Power-Factor Controller for Single-Phase PWM Rectifiers" IEEE Transactions on Industrial Electronics, vol. 46, No. 5, Oct. 1999, p. 1035-1037.
H. Zhang et al. "Capacitance, dc Voltage Utilization, and Current Stress" IEEE Industrial Electronics Magazine, Sep. 2017, pp. 37-49.
Extended European Search Report and Written Opinion issued in European Patent Application No. 22187194.0, dated Dec. 13, 2022, in 13 pages.
Meher Soumya Ran Jan et al: "A Reconfigurable On-Board Power Converter for Electric Vehicle With Reduced Switch Count", IEEE Transactions on Vehicular Technology, IEEE, USA, vol. 69, No. 4, Feb. 11, 2020, pp. 3760-3772, XP011783952, ISSN: 0018-9545, DOI: 10.1109/TVT.2020.2973316.
Vankayalapati Bhanu Teja et al: "Two stage integrated on-board charger for EVs", 2018 IEEE International Conference on Industrial Technology (ICIT), IEEE, Feb. 20, 2018, pp. 1807-1813, XP033336958, DOI: 10.1109/ICIT.2018.8352458.
Hou Ruoyu et al: "A Primary Full-Integrated Active Filter Auxiliary Power Module in Electrified Vehicles With Single-Phase Onboard Chargers", IEEE Transactions on Power Electronics, Institute of Electrical and Electronics Engineers, USA, vol. 32, No. 11, Nov. 1, 2017, pp. 8393-8405, XP011654385, ISSN: 0885-8993, DOI: 10.1109/TPEL.2017.2650482.
Onsemi LLC, AN-4151 Half-Bridge LLC Resonant Converter Design Using FSFR-Series Fairchild Power Switch, Oct. 22, 2014.
Infineon LLC Converter Design Note, Design Note AN Mar. 2013, V1.0 Mar. 2013.
Liu, Yu-Chen, et al. "High-frequency LLC Resonant Converter with GaN Devices and Integrated Magnetics." Energies 12.9 (2019): 1781.
Li, Haoran, et al. "A 300-KHz 6.6-KW SiC Bidirectional LLC Onboard Charger," IEEE Transactions on Industrial Electronics, vol. 67, No. 2, pp. 1435-1445, Feb. 2020, doi: 10.1109/TIE.2019.2910048.

* cited by examiner

DUAL-PURPOSE DRIVE AND CHARGER SYSTEMS AND METHODS THEREOF

FIELD

Example embodiments are related to drive systems and charger systems such as dual-purpose drive and charger systems.

BACKGROUND

In a conventional electric vehicle, an on-board charger is usually a stand-alone part, which means that the manufacturer needs to purchase or design a fully functional stand-alone on-board charger and install it on the vehicle.

The stand-alone on-board charger will increase the hardware cost. Meanwhile, the stand-alone charger will also occupy extra space inside the vehicle.

SUMMARY

At least some example embodiments provide an integrated on-board charger that reduces the hardware cost and system volume compared to conventional systems. Moreover, an on-board charger solution according to at least some example embodiments reduces charging current ripples by utilizing combined control techniques, such as proportional integral resonant (PIR) control, phase locked control, pulse-frequency-modulation (PFM) control techniques, along with double line frequency ripple reduction.

At least one example embodiment includes, a system includes an inverter configured to operate in at least one of a charging mode or a drive mode, a cascaded direct current (DC)-DC converter, the DC-DC converter including a first portion of the inverter and at least one controller configured to selectively couple the first portion of the inverter to a first portion of the cascaded DC-DC converter during the charging mode, and selectively couple the first portion of the inverter to a second portion of the cascaded DC-DC converter during the drive mode.

BRIEF DESCRIPTION OF THE DRAWINGS

Example embodiments will be more clearly understood from the following detailed description taken in conjunction with the accompanying drawings. FIGS. 1-6C represent non-limiting, example embodiments as described herein.

FIG. 2A illustrates a block diagram of FIGS. 2A-1 and 2A-2;

FIGS. 2A-1 and 2A-2 illustrate an integrated charging and drive control circuitry in a charging mode according to at least one example embodiment;

FIG. 2B illustrates a block diagram of FIGS. 2B-1 and 2B-2;

FIGS. 2B-1 and 2B-2 an integrated charging and drive control circuitry in a traction mode according to at least one example embodiment;

FIG. 3 illustrates current waveforms of an LLC converter shown in FIG. 2A according to at least one example embodiment;

FIGS. 6A-6C illustrate at least one example embodiment of a controller for another DC/DC converter.

DETAILED DESCRIPTION

Figure 1A:
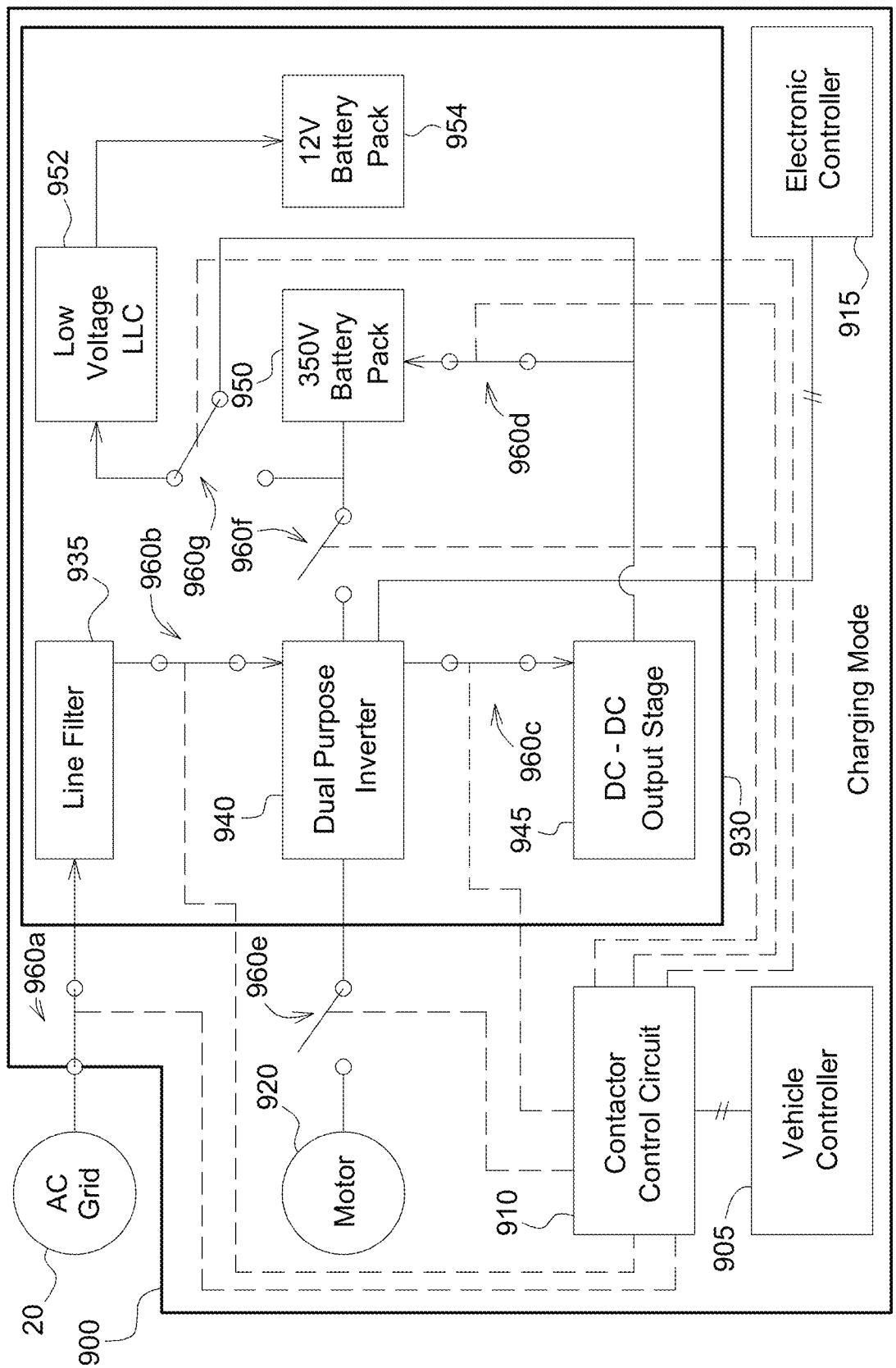
FIG. 1A illustrates a vehicle system in a charging mode according to at least one example embodiment.

Some example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware.

Such existing hardware (e.g., data processors and controllers) may be implemented using processing or control circuitry such as, but not limited to, one or more processors, one or more Central Processing Units (CPUs), one or more microcontrollers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits.

Further, at least one embodiment of the invention relates to a non-transitory computer-readable storage medium comprising electronically readable control information stored thereon, configured such that when the storage medium is used in a controller of a motor system, at least one embodiment of the method is carried out.

Even further, any of the aforementioned methods may be embodied in the form of a program. The program may be stored on a non-transitory computer readable medium and is adapted to perform any one of the aforementioned methods when run on a computer device (a device including a processor). Thus, the non-transitory, tangible computer readable medium is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects.

The term memory is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways. The term data storage device may be used interchangeably with computer-readable medium.

Figure 1B:
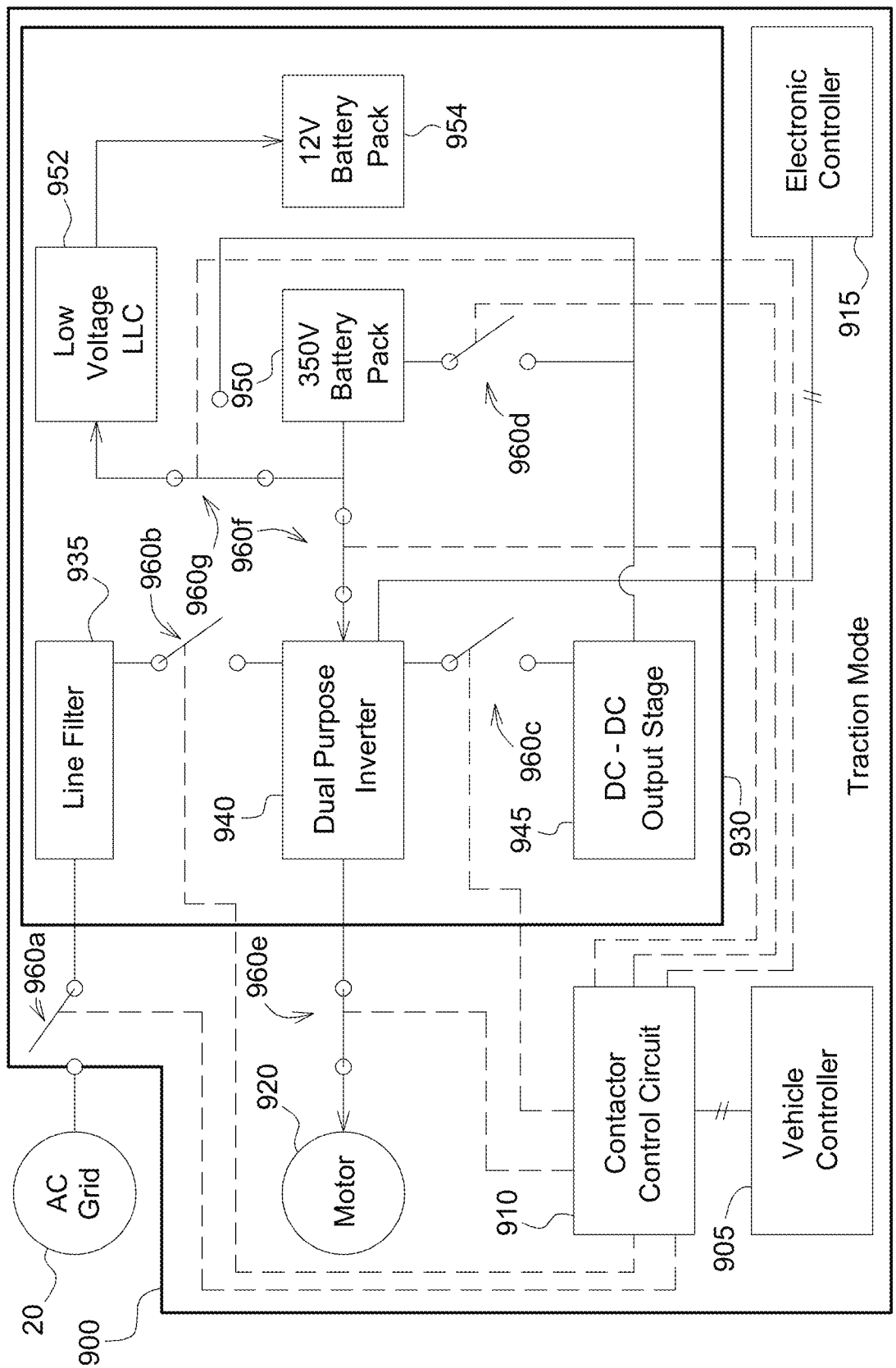
FIG. 1B illustrates a vehicle system in a traction mode according to at least one example embodiment.

FIG. 1A illustrates a vehicle system in a charging mode according to at least another example embodiment. FIG. 1B illustrates a vehicle system in a traction mode according to at least another example embodiment.

In at least one example embodiment, the vehicle system includes an inverter configured to operate in at least one of a charging mode or a drive mode, a cascaded direct current (DC)-DC converter, the DC-DC converter including a first portion of the inverter and at least one controller configured to selectively couple the first portion of the inverter to a first portion of the cascaded DC-DC converter during the charging mode and selectively couple the inverter to a second portion of the cascaded DC-DC converter during the drive mode. The drive mode may also be referred to as a traction mode or a motoring mode.

In at least one example embodiment, the cascaded DC-DC converter includes a first DC-DC converter and a second DC-DC converter and the at least one controller is configured to selectively couple the inverter to the second DC-DC converter during the drive mode.

In at least one example embodiment, the first DC-DC converter is a unidirectional DC-DC converter.

In at least one example embodiment, the first portion of the first DC-DC converter is a single active bridge and the second portion of the first DC-DC converter are two passive bridges.

In at least one example embodiment, the single active bridge is a half-bridge for active switching control and the two passive bridges are two diode bridges for rectification.

In at least one example embodiment, the first DC-DC converter further includes a plurality of diode bridges and a transformer coupled between the diode bridges and the single active bridge.

In at least one example embodiment, the system further includes a first voltage source and a second voltage source, wherein the first DC-DC converter is a first LLC converter having a first inductor connected in series with the first voltage source and the second DC-DC converter is a second LLC converter having a second inductor connected in series with the second voltage source.

In at least one example embodiment, the at least one controller is configured to control the first portion of the inverter during the charging mode based on a DC bus reference voltage.

In at least one example embodiment, the at least one controller includes a proportional-integral-resonant (PIR) controller, a proportional-integral (PI) controller, phase-locked-loop (PLL) controller and a notch filter.

In at least one example embodiment, the at least one controller includes a proportional-integral-resonant (PIR) controller and a pulse-frequency-modulation (PFM) controller for the first DC-DC converter.

In at least one example embodiment, the at least one controller includes a proportional-integral (PI) controller and a pulse-frequency-modulation (PFM) controller for the second DC-DC converter.

In at least one example embodiment, the system includes a single-phase AC-DC converter and two cascaded DC/DC converters during the charging mode.

In at least one example embodiment, the charging mode includes a constant current (CC) mode and a constant voltage (CV) mode and the at least one controller is configured to cause the system to operate in a CC mode or CV mode during the charging mode.

At least one example embodiment provides a computer-readable medium, when executed by at least one controller, configured to cause a vehicle system to selectively couple a first portion of an inverter to a first portion of a cascaded DC-DC converter during a charging mode, and selectively couple the inverter to a second portion of the cascaded DC-DC converter during a drive mode.

In at least one example embodiment, the computer-readable medium, wherein when executed by the at least one controller, is configured to cause the vehicle system to execute a proportional-integral-resonant (PIR) controller, a proportional-integral (PI) controller, phase-locked-loop (PLL) controller and a notch filter.

In at least one example embodiment, the computer-readable medium when executed by the at least one controller, is configured to cause the vehicle system to operate in one of a constant current (CC) mode or a constant voltage (CV) mode during the charging mode.

In at least one example embodiment, the vehicle system includes an inverter configured to operate in at least one of a charging mode or a drive mode, a cascaded direct current (DC)-DC converter, the DC-DC converter including a first portion of the inverter and means for selectively coupling the first portion of the inverter to a first portion of the cascaded DC-DC converter during the charging mode and selectively coupling the inverter to a second portion of the cascaded DC-DC converter during the drive mode.

In at least one example embodiment, the cascaded DC-DC converter includes a first DC-DC converter and a second DC-DC converter and the vehicle system includes means for selectively coupling the inverter to the second DC-DC converter during the drive mode.

In at least one example embodiment, the vehicle system includes means for controlling the first portion of the inverter during the charging mode based on a DC bus reference voltage.

In at least one example embodiment, the means for controlling includes a proportional-integral-resonant (PIR) controller, a proportional-integral (PI) controller, phase-locked-loop (PLL) controller and a notch filter.

In at least one example embodiment, the means for controlling includes a proportional-integral-resonant (PIR) controller and a pulse-frequency-modulation (PFM) controller for the first DC-DC converter.

In at least one example embodiment, the means for controlling includes a proportional-integral (PI) controller and a pulse-frequency-modulation (PFM) controller for the second DC-DC converter.

In at least one example embodiment, the means for controlling is configured to cause the system to operate in a CC mode or CV mode during the charging mode.

As shown in FIGS. 1A-1B, a vehicle system 900 may include a vehicle controller 905, a contactor control circuit 910, an electronic controller 915, a motor 920 and integrated charging and drive control circuitry 930. The integrated charging and drive control circuitry 930 may include a filter 935 (e.g., a line filter), a dual purpose inverter 940, a DC-DC output stage 945, a first power supply 950 (e.g., a 350 V battery pack), a converter 952 and a second power supply 954 (e.g., a 12 V battery). While not shown, additional loads may be attached to the converter 952 in parallel with the second power supply 954.

As will be described, the dual purpose inverter 940 includes a single inverter. A portion of the dual purpose inverter 940 is configured to operate as part of a cascaded DC-DC converter during the charging mode.

The vehicle controller 905 controls the contactor control circuit 910 to selectively couple the inverter 940 to the motor during a drive mode (also referred to as the traction mode or a motoring mode), selectively couple the first portion of the inverter to a first portion of the cascaded DC-DC converter during the charging mode, and selectively couple the the inverter to a second portion of the cascaded DC-DC converter during the drive mode.

Referring to FIG. 1A, in the charging mode, the vehicle controller 905 provides a signal to the contactor control circuit 910 to close a switch 960a to connect the AC grid 20 to the filter 935. In an example embodiment, the AC grid 20 provides an input voltage (RMS) of 120 V with an input current (RMS) of 45 A or a voltage of 240 V with a current of 22.5 A. An operator may set a mode signal by selecting the control mode (e.g., charging mode or traction mode) by pushing a button or using an interface such as a touch screen on a vehicle. The mode signal indicates whether the vehicle system 900 is to operate in at least one of a charging mode or a traction mode. In other example embodiments, the vehicle controller 905 may select the control mode and set the mode signal based on whether the vehicle system 900 is connected to the grid 20 and whether the motor 920 is running. For example, the vehicle controller 905 may set the mode signal to a charging mode if the vehicle system 900 is connected to the grid 20 and the motor 920 is not running.

In a same signal or different signal to the contactor control circuit 910 to close a switch 960*a*, the vehicle controller 905 also provides instructions to the contactor control circuit 910 to close a switch 960*b* to connect the filter 935 to the dual purpose inverter 940, to close a switch 960*c* to connect the dual purpose inverter 940 to the DC-DC output stage 945, to close a switch 960*d* to connect the DC-DC output stage 945 to the first power supply 950, and to operate a switch 960*g* to connect the DC-DC output stage 945 to the converter 952. In the charging mode, the vehicle controller 905 and the contactor control circuit 910 collectively operate to open switches 960*e* and 960*f*.

As shown in FIG. 1A, a portion of the dual purpose inverter 940 is configured to operate as an AFE AC-DC converter during the charging mode and a portion of the dual purpose inverter 940 is part of a DC-DC converter during the charging mode. More specifically, two phases (i.e., two half-bridges) of the dual purpose inverter 940 may operate as a single phase AFE converter and one phase (i.e., one half-bridge) may operate as part of a DC-DC converter.

Referring to FIG. 1B, in the traction mode, the vehicle controller 905 provides a signal to the contactor control circuit 910 to close the switch 960*e* to connect the motor 920 to the dual purpose inverter 940.

In a same signal or different signal to the contactor control circuit 910 to close the switch 960*e*, the vehicle controller 905 also provides instructions to the contactor control circuit 910 to close a switch 960*f* to connect the dual purpose inverter 940 to the first power supply 950 and to operate the switch 960*g* to connect the first power supply 950 to the converter 952. In the traction mode, the vehicle controller 905 and the contactor control circuit 910 collectively operate to open switches 960*a*, 960*b*, 960*c* and 960*d*. The first power supply 950 may be a 350 V battery.

The vehicle controller 905 may be implemented as hardware, such as a processor, firmware or hardware executing software as a special purpose machine. When the vehicle controller 105 is hardware, such hardware may include one or more Central Processing Units (CPUs), digital signal processors (DSPs), application-specific-integrated-circuits (ASICs), field programmable gate arrays (FPGAs) computers or the like configured as special purpose machines to perform the functions of described herein. CPUs, DSPs, ASICs and FPGAs may generally be referred to as processors and/or microprocessors.

In the event that the vehicle controller 905 is a processor executing software, the processor is configured as special purpose machine to execute the software to perform the functions of the vehicle controller 905.

In an example embodiment, the vehicle controller 905 is a vehicle control unit (VCU).

Two features of some vehicles (e.g., a backhoe) are an on-board charger and a 12 V output dc-dc converter. The on-board charger allows a user to get power from a utility AC power grid and charge a main 350 V battery in the vehicle, while the 12 V output DC-DC converter could draw power from the main 350V battery and provide power to 12V auxiliary loads, such as a pump, a heater, lighting, and fans. In the conventional electric vehicle, the on-board charger and 350-12 V DC-DC converter are usually stand-alone parts. However, those stand-alone parts increase the hardware cost and may occupy more space.

Figures 1, 2A:
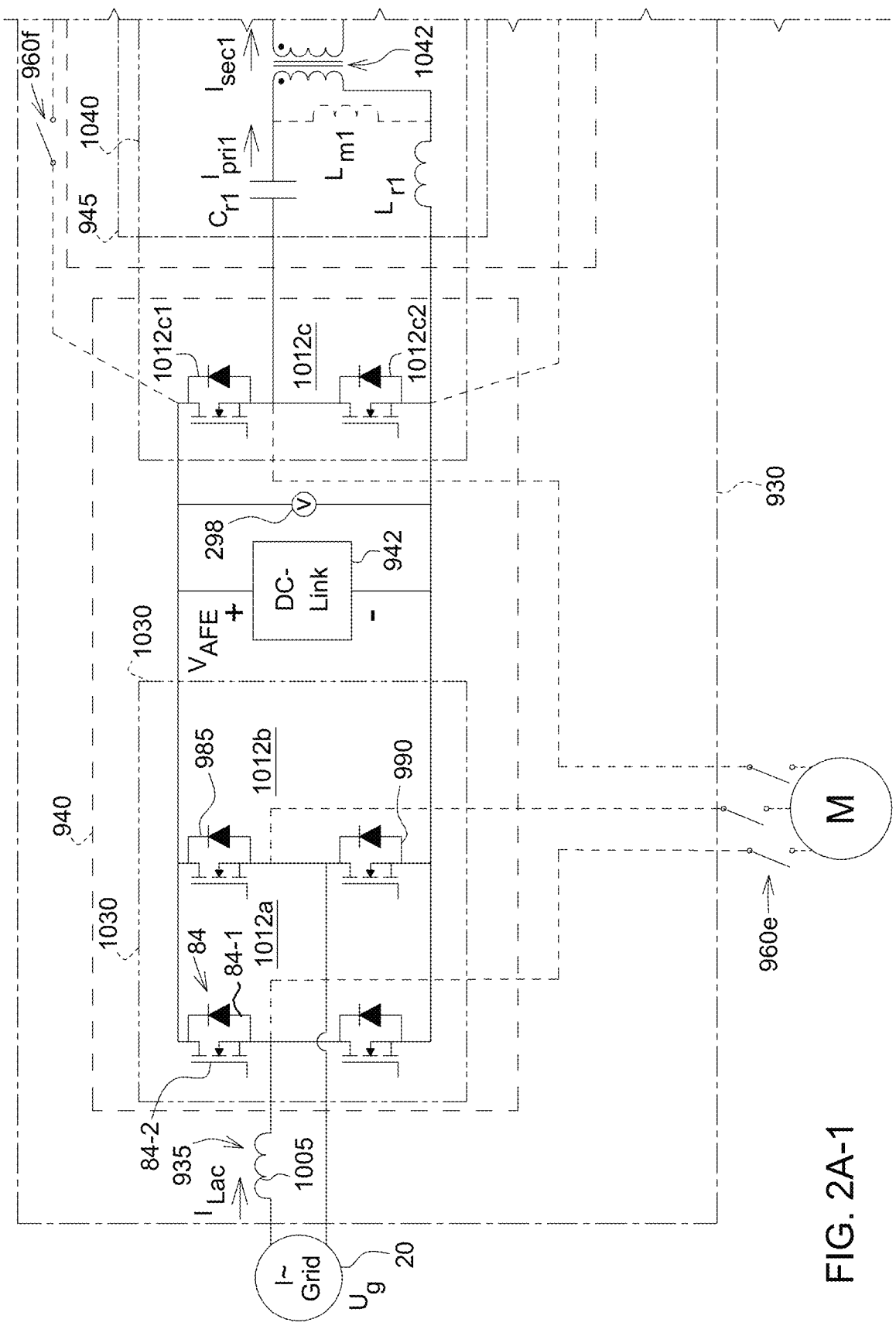
Figures 2, 2A:
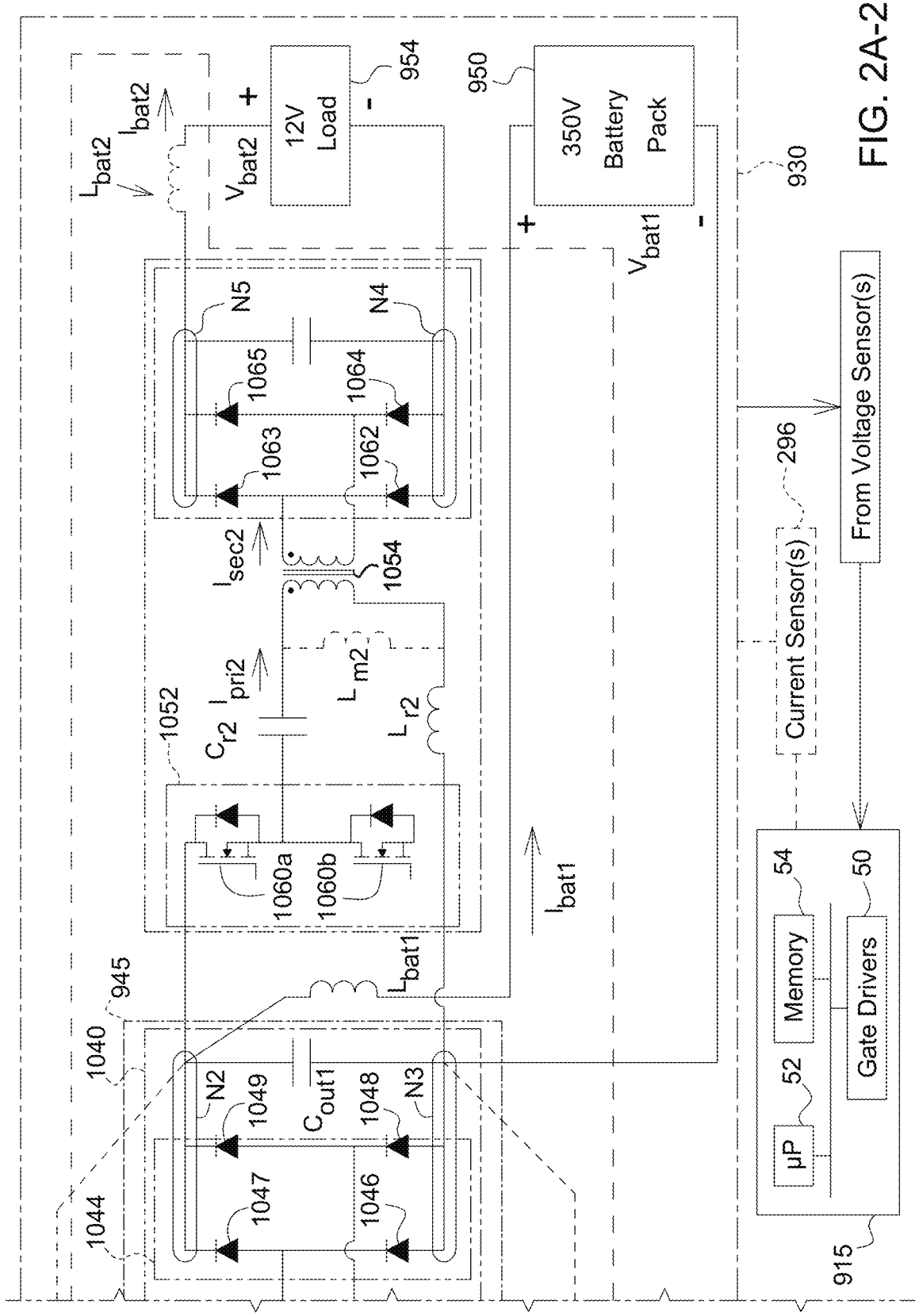
Figures 1, 2B:
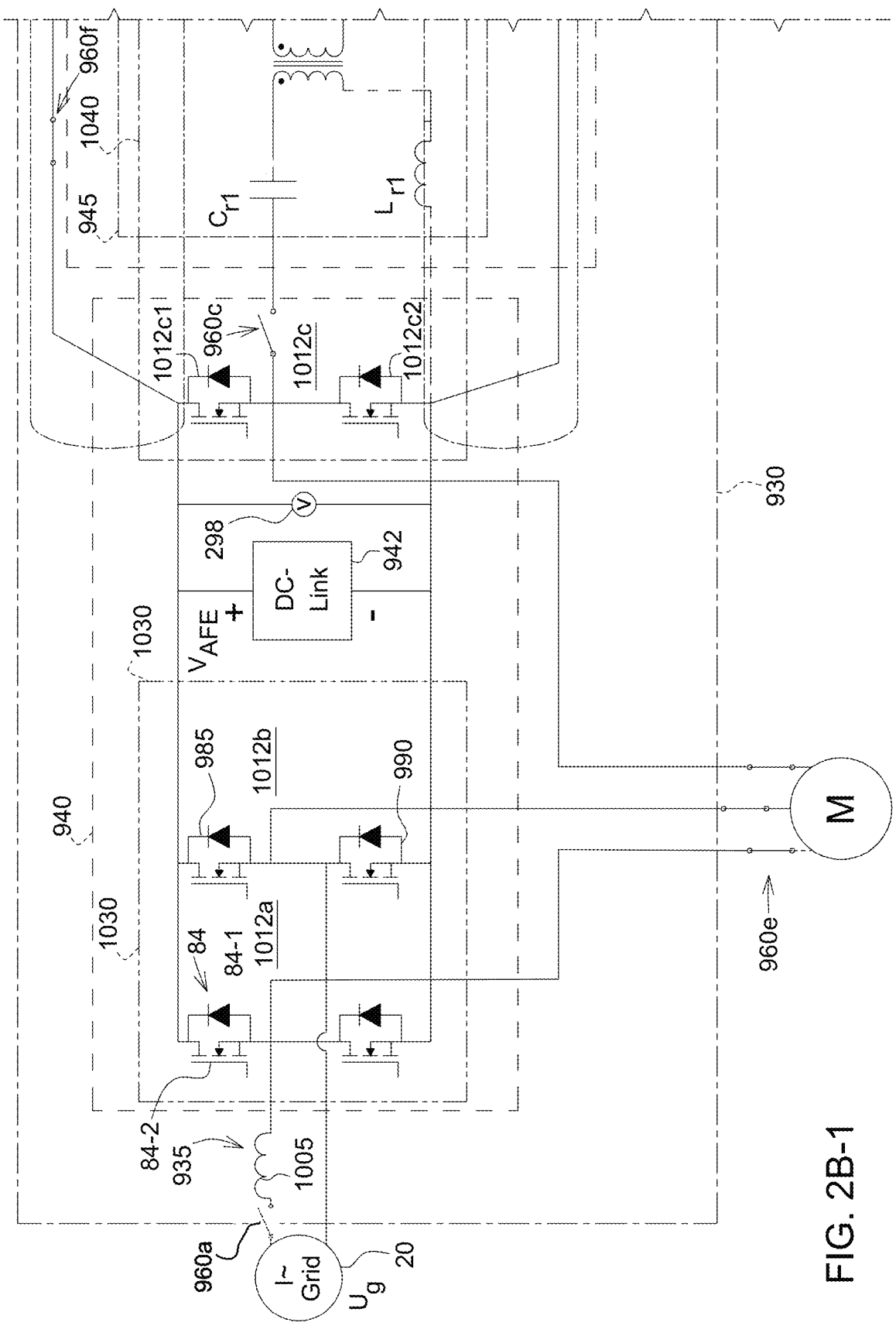
Figures 2, 2B:
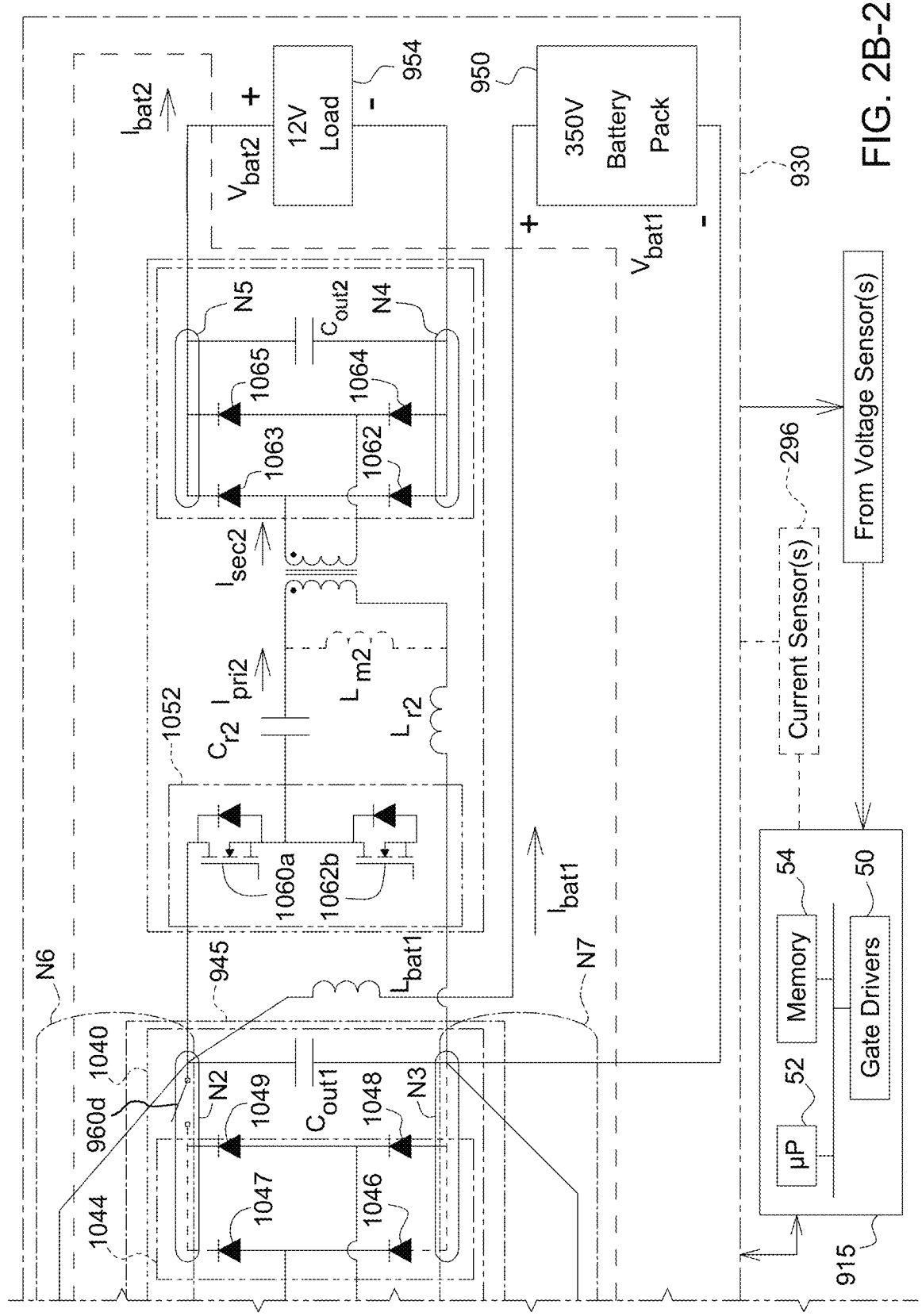

FIGS. 2A-1-2A-2 illustrate an integrated charging and drive control circuitry in a charging mode according to an example embodiment. FIGS. 2B-1-2B-2 illustrate an integrated charging and drive control circuitry in a traction mode according to an example embodiment.

In FIGS. 2A-1, 2A-2, 2B-1 and 2B-2, lines and elements that are dashed (instead of black) indicate they are operably disconnected from the system during a particular mode (with the exception of the current sensor(s) and an inductor $L_{bat2}$, which indicates the use of a current sensor and/or the inductor $L_{bat2}$ may occur in some example embodiments). As shown, the integrated charging and drive control circuitry 930 includes the dual purpose inverter 940 and peripheral circuitry 1020. As will be described, the dual purpose inverter 940 is configured for dual purposes: traction drive and for use in a charger. Thus, existing hardware in an inverter can be reused for an on-board charger. In some example embodiments, hardware costs and system volumes may be reduced because the existing traction inverter is repurposed into a utility cascaded on-board charger with a few additional components.

In some example embodiments, the system 900 (shown in FIG. 1A) reduces high-frequency ripples in battery charging currents and the controller 915 reduces the impact of double line-frequency ripples in a AFE DC-link output voltage, which is caused by the single-phase power source (the grid 20) and can deteriorate the charging performance.

As can be seen in FIGS. 2A-1 and 2A-2 and will be described in further detail, the inverter 940 is disconnected from the motor 920 and re-configured as an AC-DC converter (a single-phase AFE converter) plus a first DC-DC converter 1040 (e.g., a half-bridge LLC converter) to charge the first power supply 950 with the help of switches and passive components (e.g., diodes). The converter 952 (e.g., a half-bridge LLC converter) is used to charge the second power supply 954 during the charging mode. In the traction mode shown in FIG. 1B, where the inverter 940 is used to drive the traction motor 920 and the main 350V battery on-board charger part (i.e., the DC/DC output stage 945) is disconnected from the system. The DC/DC output stage 945 includes a resonant tank ($C_{r1}$, $L_{r1}$, $L_{m1}$), a transformer 1042, a diode bridge, and the DC output capacitor $C_{out1}$. The DC-DC converter 952 provides power to support the 12 V auxiliary loads in the traction mode.

The inverter 940 includes half-bridges 1012*a*, 1012*b* and 1012*c*. Each half-bridge includes two switch packages 84 that are placed across a DC-link 942. Each switch package 84 includes a diode 84-1 and a MOSFET transistor 84-2.

One switch package 84 in each half-bridge is a top-side 985 of the half-bridge and the other switch package 84 is a bottom side 990 of the half-bridge. When the appropriate voltage is applied to the gate of an MOSFET transistor 84-2, the transistor 84-2 may be activated and the drain may be coupled electrically to the emitter to supply electric power. The appropriate voltage depends on a rating of the transistor 84-2. For example, 14 V may be applied at the gate to turn the transistor 84-2 on. Negative 8 V may be applied at the gate with to turn the transistor 84-2 off.

Although MOSFET transistors are shown, field effect transistors, complementary metal oxide semiconductors, power transistors, or other suitable semiconductor devices may be used.

As used in this document, switch states indicate whether a properly functioning or unimpaired semiconductor device is active ("on" or "closed") or inactive ("off" or "open"). A failure of a semiconductor device to change states may result in a semiconductor device failing in an open state or a closed state, for example.

The controller 915 may have gate drivers 50, a microprocessor 52 coupled electrically to the gate drivers 50, and memory 54 coupled electrically to the microprocessor 52 and having stored therein operating instructions for the microprocessor 52. The gate of each transistor 84-2 is coupled electrically to a respective gate driver 50 that is dedicated to that transistor 84-2 and may provide a DC voltage (e.g., 14 V DC) to turn on and off that transistor 84-2. Thus, there may be a gate driver 50 for each transistor 84-2. The gate drivers 50 for the transistor 84-2 are under the control of the microprocessor 52, which may employ a pulse-frequency-modulation (PFM) (or pulse-width-modulation (PWM)) control scheme to control those gate drivers 50 and the transistor 84-2 to supply electric energy to the DC-link 942 in the charging mode and remove electric energy from the DC-link 942 in the traction mode.

The DC-link 942 may have a high rating, for example, 700V, and a capacitance $C_{dc}$ determined based on the inverter design and applications' requirements. In at least one example, the capacitance $C_{dc}$ is 1000 μF.

As shown in FIGS. 2A-1-2A-2, during the charging mode, the filter 935 includes an inductor 1005. A first end of the inductor 1005 is connected to the grid 20 and a second end of the inductor 1005 is connected between the switch packages 84 of the half-bridge 1012a (i.e., between a source of the MOSFET of high side switch package 84 and a drain of the MOSFET of the low side switch package 84). In some example embodiments, the inductor 1005 may have an inductance of 300 μH, and the zero-crossing frequency of the L filter is about 530 Hz.

While the filter 935 is illustrated as an L filter, it should be understood that other filters may be used such as an LR filter or an LCL filter.

The output of the filter 935 (the second end of the inductor 1005) is input to a single-phase AFE converter 1030. The single-phase AFE converter 1030 includes the half-bridges 1012a and 1012b. The single-phase AFE converter 1030 receives pulse-width modulated signals from the controller 915 to convert the AC voltage output from the grid 20 to DC voltage through the filter 935. The switching frequency of the transistors 84-2 in the AFE converter 1030 may be 15 kHz. The single-phase AFE converter 1030 outputs a voltage $V_{AFE}$ to the DC-link 942. As indicated above, other power switches such as IGBTs may be used instead of MOSFETS.

A DC-DC converter 1040 includes the half-bridge 1012c, a capacitor $C_{r1}$, and inductor $L_{r1}$, a transformer 1042, a diode bridge 1044 and an output capacitor $C_{out1}$. The diode bridge 1044 includes diodes 1046-1049. Diodes may be considered passive components.

A first end of the capacitor $C_{r1}$ is connected between the switch packages 84 of the half-bridge 1012c (i.e., between a source of the MOSFET of a high side switch package 1012c1 of the half-bridge 1012c and a drain of the MOSFET of a low side switch package 1012c2 of the half-bridge 1012c). A second end of the capacitor $C_{r1}$ is connected to a first end of a primary side of the transformer 1042.

A first end of the inductor $L_{r1}$ is connected to a low-side rail of the inverter 940 and a source of the MOSFET of the low side switch package 84 of the half-bridge 1012c. A second end of the inductor $L_{r1}$ is connected to a second end of the primary side of the transformer 1042.

A first end of a secondary side of the transformer 1042 is connected between the diodes 1046 and 1047. A second end of the secondary side of the transformer 1042 is connected between the diodes 1048 and 1049.

First ends of the diodes 1046 and 1048 are connected to a node N3. A second end of the diode 1046 is connected to a first end of the diode 1047 (and the first end of the secondary side of the transformer 1042). A second end of the diode 1048 is connected to a first end of the diode 1049 (and the second end of the secondary side of the transformer 1042).

Second ends of the diodes 1047 and 1049 are connected to a node N2. The output capacitor $C_{out1}$ has a first end connected to the node N3 and a second end connected to the node N2.

The converter 952 provides power to the second power supply 954 and other loads and may be a unidirectional DC-DC converter. The converter 952 is connected to the converter 1040 at nodes N2 and N3.

The input voltage for the second converter 952 is the output of the converter 1040 (i.e., a voltage across $C_{out1}$). The converter 952 includes an active half-bride 1052, a capacitor $C_{r2}$, and inductor $L_{r2}$, a transformer 1054, a diode bridge 1056 and an output capacitor $C_{out2}$. The diode bridge 1056 includes diodes 1062-1065.

In some example embodiments, the converter 952 may include an inductor $L_{bat2}$ is included. The inductor $L_{bat2}$ may be considered a cable impedance or extra inductor.

The active half-bridge 1052 includes a high side switch package 1060a and a low side switch package 1060b. The high side switch package 1060a and the low side switch package 1060b are structured in the same manner as the high side and low side switch packages 84.

A drain of the MOSFET of the high side switch package 1060a is connected to the node N2. A source of the MOSFET of the low side switch package 1060b is connected to the node N3.

A first end of the capacitor $C_{r2}$ is connected between the high side switch package 1060a and the low side switch package 1060b (i.e., between a drain of the MOSFET of the low side switch package 1060b and a source of the MOSFET of the high side switch package 1060a). A second end of the capacitor $C_{r2}$ is connected to a first end of a primary side of the transformer 1054.

A first end of the inductor $L_{r2}$ is connected to source of the MOSFET of the low side switch package 1060b and the node N3. A second end of the inductor $L_{r2}$ is connected to a second end of the primary side of the transformer 1054.

A first end of a secondary side of the transformer 1054 is connected between the diodes 1062 and 1063. A second end of the secondary side of the transformer 1054 is connected between the diodes 1064 and 1065.

First ends of the diodes 1062 and 1064 are connected to a node N4. A second end of the diode 1062 is connected to a first end of the diode 1063 (and the first end of the secondary side of the transformer 1054). A second end of the diode 1064 is connected to a first end of the diode 1065 (and the second end of the secondary side of the transformer 1054).

Second ends of the diodes 1063 and 1065 are connected to a node N5. The output capacitor $C_{out2}$ has a first end connected to the node N4 and a second end connected to the node N5. While only one output capacitor $C_{out2}$ is shown, it should be understood that each 12 V load may have its own input capacitor.

In embodiments where the converter 952 includes the inductor $L_{bat2}$, the inductor $L_{bat2}$ includes a first end connected to the node N5 and a second end connected to the power supply 954.

An inductor $L_{bat1}$ has a first end connected to the node N2 and a second end connected to a positive terminal of the first power supply 950. A negative terminal of the first power supply 950 is connected to the node N3. The inductor $L_{bat1}$ reduces the charging current ripple.

A positive terminal of the second power supply 954 is connected to the node N5 and a negative terminal of the second power supply 954 is connected to the node N4.

Both the converter 1040 and the converter 952 have the same structure and may be considered LLC converters. Each of the converters 1040 and 952 may be modeled using a first-harmonic-approximation (FHA) method, where a steady-state voltage gain for each converter could be:

$$\left|\frac{2nV_{out}}{V_{in}}\right| = \left|\frac{m\frac{\omega^2}{\omega_1^2}}{jmQ\frac{\omega}{\omega_1}\left(\frac{\omega^2}{\omega_2^2}-1\right)+\left(\frac{\omega^2}{\omega_2^2}-1\right)}\right| \quad (1)$$

where $m=L_m/L_r$ is the inductance ratio, $L_r$ (i.e., $L_{r1}$ or $L_{r2}$) is the resonant inductance (can be from either the transformer leakage inductance or external inductor), $L_m$ (i.e., Lm1 or Lm2) is the magnetizing inductance, $C_r$ (i.e., $C_{r1}$ or $C_{r2}$) is the resonant capacitor, $$\omega_1 = \sqrt{\frac{1}{C_r L_r}} \text{ and } \omega_2 = \sqrt{\frac{1}{C_r(L_r+L_m)}}$$

are the resonant frequency of the LLC converter, n is the transformer turns ratio, $$R_{ac} = \frac{8n^2}{\pi^2} R_{load}$$

is an equivalent ac load resistance at the switching frequency of the high side switch package of the converter, $R_{load}$ is the actual load resistance, and $$Q = \sqrt{\frac{L_r}{C_r}} \frac{1}{R_{ac}}$$

is a quality factor of the converter, which will represent the output power. Basically, the higher output power, the higher Q value. Transformer models, as described in Onsemi LLC, *AN-4151 Half-Bridge LLC Resonant Converter Design Using FSFR-Series Fairchild Power Switch*, Oct. 22, 2014 (https://www.onsemi.com/pub/Collateral/AN-4151.pdf, last accessed Jun. 3, 2021), the entire contents of which are hereby incorporated by reference, may be used.

For the converter 1040, the voltage $V_{in}$ is the voltage across the DC-link 942 (i.e., output voltage of the AFE converter 1030) and $V_{out}$ is the voltage across the capacitor $C_{out1}$. For the converter 952, the voltage $V_{in}$ is the voltage across the capacitor $C_{out}$ and $V_{out}$ is the voltage across the capacitor $C_{out2}$ (i.e., the voltage $V_{bat2}$).

Each of the converters 1040 and 952 may be the same type of DC-DC converter. Thus, each of the converters 1040 and 952 may achieve zero voltage switching (ZVS) operation in the primary side (e.g., at times $T_1$, $T_2$ and $T_3$ in FIG. 3) and DCM operation on the secondary side if the switching frequency of the converter is within a range $[\omega_2, \omega_1]$, where $$\omega_1 = 1/\sqrt{L_r C_r} \quad (2)$$

$$\omega_2 = 1/\sqrt{(L_r+L_m)C_r} \quad (3)$$

For example, the converter 1040 may achieve zero voltage switching (ZVS) operation in the primary side of the transformer 1042 and DCM operation on the secondary side of the transformer 1042 if the switching frequency of the switch package 1012c1/c2 is within a range $[\omega_2, \omega_1]$. Moreover, the converter 952 may achieve zero voltage switching (ZVS) operation in the primary side of the transformer 1054 and DCM operation on the secondary side of the transformer 1054 if the switching frequency of the switching packages 1060a/b is within a range $[\omega_2, \omega_1]$. The converter 1040 may be controlled such that the high side switch (or top switch), and the bottom switch operate in a complementary mode (top/bottom: ON/OFF or top/bottom: OFF/ON). Similarly, the converter 952 may be controlled such that the high side switch (or top switch), and the bottom switch operate in a complementary mode (top/bottom: ON/OFF or top/bottom: OFF/ON).

The voltage gain conditions for the converters 1040 and 952 may be (4)

$$\left|\frac{2nV_{out}}{V_{in,max}}\right|_{\omega_1} > 1 \quad (a)$$

$$\left|\frac{2nV_{out}}{V_{in,min}}\right|_{\omega_2} < \left|\frac{m\sqrt{m+1}}{m^2 Q}\right| \quad (b)$$

where $V_{in,min}$ is the minimal input voltage of the applicable LLC converter, and $V_{in,max}$ is the maximum input voltage of the applicable LLC converter.

In some example embodiments, a current sensor 296 (shown in FIG. 2A-2) may be used to detect the zero-crossing point of the currents $I_{sec1}$ and $I_{sec2}$. The current sensor provides current measurements to the controller 915.

Figure 3:
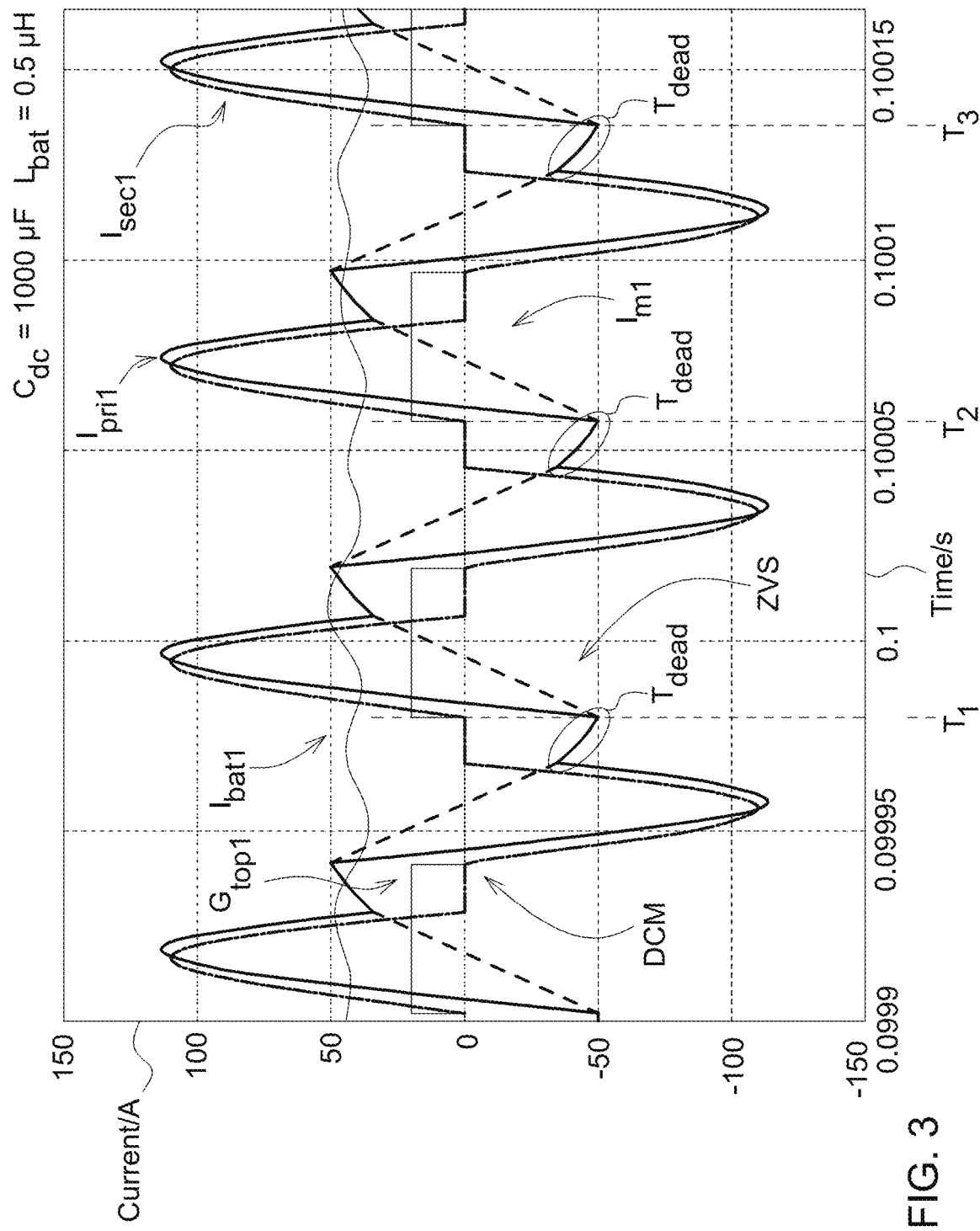

FIG. 3 illustrates current waveforms of the converter 1040 according to at least one example embodiment. In an example embodiment, a capacitance Cdc of the DC-link 942 is 1000 μF and inductance of the inductor $L_{bat}$ in the converter 1040 is 0.5 μH.

For example, FIG. 3 illustrates a gating signal $G_{top1}$, a power source current $I_{bat1}$ (also shown in FIG. 2A-2), a magnetizing current $I_{m1}$, a primary side current $I_{pri1}$ (also shown in FIG. 2A-1) and a secondary side current $I_{sec1}$ (also shown in FIG. 2A-1). The magnetizing current $I_{m1}$ is the magnetizing current of the transformer 1042. The gate signal $G_{to1p}$ controls the high-side transistor of the half-bridge 1012c.

The control methods and design of the converter 1040 described with reference to FIG. 3 are also applicable to the converter 952. Thus, for the following description of FIG. 3, the subscript "1" or "2" is omitted to indicate that the control method applies to both the converter 1040 and the converter 952 (they may be controlled independently) except when referring specifically to what is shown in FIG. 3.

Before the high side gate signal $G_{top}$ for a MOSFET, the primary side current $I_{pri}$ is negative, thus, ZVS could be achieved if the power device is an ideal switch, as the current flows through the body-diode of the high side switch (e.g., diode of switch package 1012c1 and diode of the switching package 1060a) during the deadtime.

However, both IGBT and MOSFET transistors have an output capacitance $C_{oss}$ which is caused by the physical structure of the junction. Due to the existence of the capacitance $C_{oss}$, when the low side switch is off, the primary side current may not directly flow through the body-diode of the high side switch.

However, the primary side current $I_{pri}$ discharges the capacitance $C_{oss}$ first, as the top switch voltage is clamped by the capacitance $C_{oss}$ and prevents/restricts the current flowing through the high side body-diode. Thus, in the ZVS operation the primary side current $I_{pri}$ discharges the capacitance $C_{oss}$ during a deadtime Tdead.

As shown in FIG. 3 during the deadtime $T_{dead}$, the primary side current $I_{pri1}$ is the same as the magnetizing current $I_{m1}$, as the secondary side current $I_{sec1}$ is zero (DCM operation).

A selection of a magnetizing inductance $L_m$ (e.g., $L_{m1}$ or $L_{m2}$) and deadtime $T_{dead}$ is based on $$T_{dead}=16C_{oss}F_{sw}L_m \tag{5}$$

where $F_{sw}$ is the switching frequency of the switch package.

In some example embodiments, the converter 1040 has a resonant frequency ω1 of 20 kHz, m is 10, and the transformer turns ratio is 0.9625 for 400 V output and 770 V input. Moreover, an upper limit of the quality factor Q may be:

$$Q < \frac{m\sqrt{m+1}}{m^2} \frac{V_{in,min}}{2nV_{out}}. \tag{6}$$

As $$Q = \sqrt{\frac{L_r}{C_r}} \frac{1}{R_{ac}},$$

and the equivalent ac load resistance at the switching frequency $R_{ac}$ could be calculated based on a maximum output power, the leakage inductance $L_r$ can be calculated as $$L_r = \frac{QR_{ac}}{\omega_1}. \tag{7}$$

In some example embodiments, the quality factor Q may be 95% of the upper limit, and the equivalent ac load resistance at the switching frequency $R_{ac}$ may be calculated at the highest output power. Based on the value of $L_r$, the capacitance $C_r$ and inductance $L_m$ can be calculated according $$L_m=mL_r \tag{8}$$

Thus, in some example embodiments, the leakage inductance $L_r$ is set as 10.9 uH, the capacitance $C_r$ is 5.8 uF, and the inductance $L_m$ is 109.5 uH for the converter 1040.

The designs of the converters 1040 and 952 may be performed in the same manner. The required components are the same. For example, both LLC converters needs transformer, inductor, and capacitor. However, the values of the transformer, the inductor, and the capacitor are different between the converters 1040 and 952 since the converters 1040 and 952 may have different voltage and power ratings.

The controller 915 may include separate controllers for the AFE converter 1030 (a controller 1200), the converter 1040 (a controller 1300) and the converter 952 (a controller 1400).

Figure 4A:
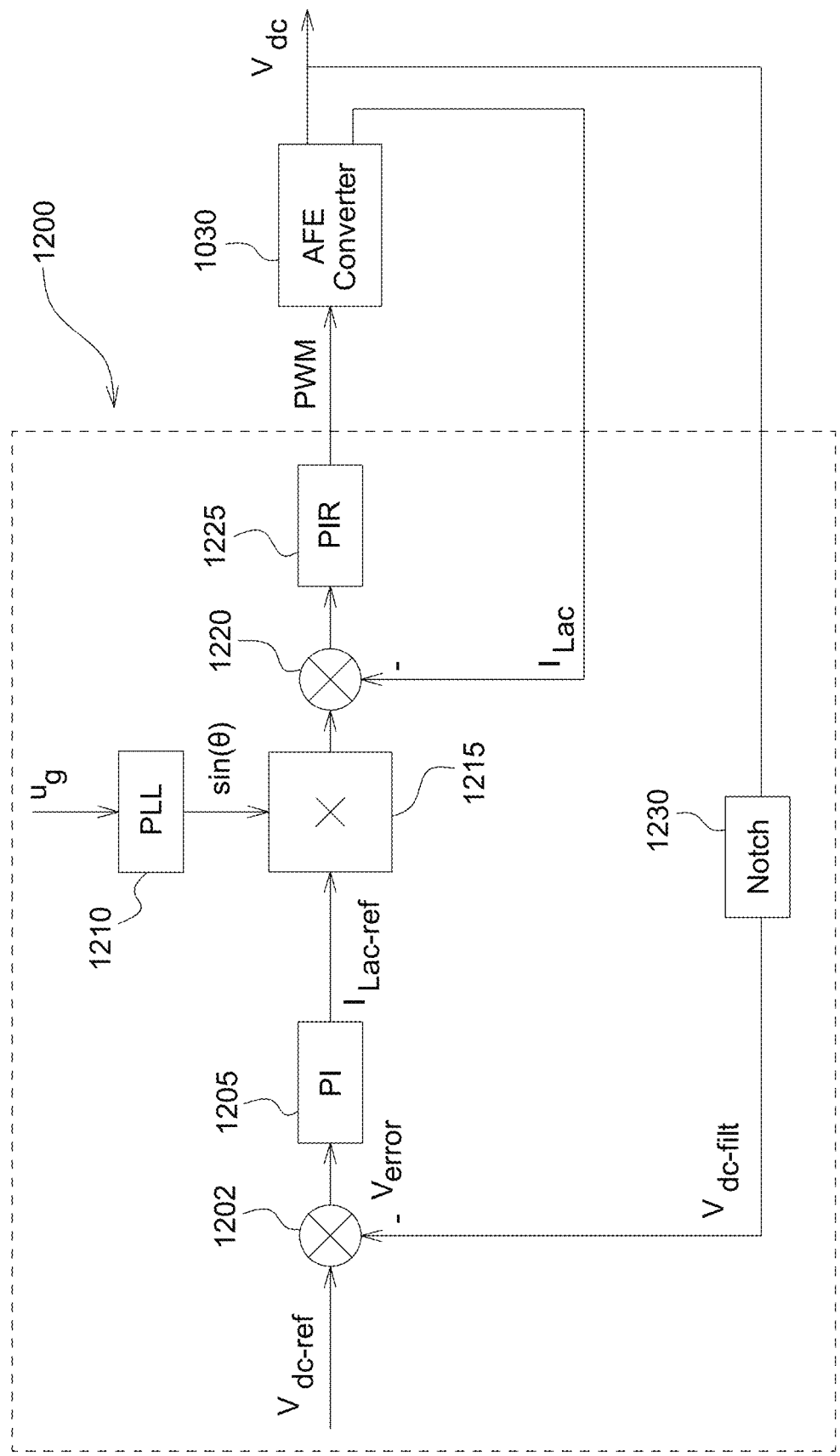
FIGS. 4A-4B illustrate at least one example embodiment of an AFE (Active Front End) controller.

FIG. 4A illustrates at least one example embodiment of an AFE controller.

As shown, an AFE controller 1200 may include a subtractor 1202, a proportion integral (PI) controller 1205, a phase-locked-loop (PLL) controller 1210, a multiplier 1215, a subtractor 1220, a proportion-integral-resonant (PIR) controller 1225 and a notch filter 1230. The AFE controller 1200, including the subtractor 1202, the proportion integral (PI) controller 1205, the phase-locked-loop (PLL) controller 1210, the multiplier 1215, the subtractor 1220, the proportion-integral-resonant (PIR) controller 1225 and the notch filter 1230 may be implemented as hardware, such as a processor, firmware or hardware executing software as a special purpose machine.

When the AFE controller 1200 is hardware, such hardware may include one or more Central Processing Units (CPUs), digital signal processors (DSPs), application-specific-integrated-circuits (ASICs), field programmable gate arrays (FPGAs) computers or the like configured as special purpose machines to perform the functions of the subtractor 1202, the proportion integral (PI) controller 1205, the phase-locked-loop (PLL) controller 1210, the multiplier 1215, the subtractor 1220, the proportion-integral-resonant (PIR) controller 1225 and the notch filter 1230. CPUs, DSPs, ASICs and FPGAs may generally be referred to as processors and/or microprocessors.

In the event that the AFE controller 1200 is a processor executing software, the processor is configured as special purpose machine to execute the software to perform the functions of the AFE controller 1200.

During a fundamental cycle of the grid, an output capacitor of the AFE converter 1030 (i.e., the dc-link 942) will be charged and discharged, and the charging energy may be $$E=P_{AFE}/\omega_{grid} \tag{9}$$

where $P_{AFE}$ is the output power of the AFE converter 1030, and $\omega_{grid}$ is a fundamental frequency of the grid.

The energy stored in the dc-link capacitor 942 can be written as $E_{cap}=0.5\ CV^2$, and a double line-frequency voltage ripple on the output voltage of the AFE converter 1030 can be $$E \approx C_{dc}(V_{max}-V_{min})V_{avg}. \tag{10}$$

where $C_{dc}$ is the output capacitance of the AFE converter, i.e., the dc-link capacitance, $V_{max}$ and $V_{min}$ are the AFE output voltage maximum and minimal values respectively, and $V_{avg}$ is the average output voltage of the AFE converter 1030. The average output voltage $V_{avg}$ may be measured using a voltage sensor (e.g., the voltage sensor 298, and averaging the measured voltage during one wave cycle at the fundamental frequency of the grid (e.g., 60 Hz).

In example, if the output power of the AFE converter 1030 is 17 kW and the dc-link capacitance is 1.5 mF, the output voltage ripple is about ±23 V if the average output voltage of the AFE converter 1030 is 657 V.

In other example embodiments, a virtual d-q frame control may be used to control the output voltage of the AFE converter 1030.

An outer loop of the controller 1200 is a voltage loop to regulate the output voltage of the AFE converter 1030.

As shown in FIG. 4A, the subtractor generates a difference between a DC-link reference voltage $V_{dc\text{-}ref}$ and a filtered dc-link voltage $V_{dc\text{-}filt}$. The PI controller 1205 receives the difference the DC-link reference voltage $V_{dc\text{-}ref}$ and the filtered dc-link voltage $V_{dc\text{-}filt}$ and generates $I_{Lac\text{-}ref}$.

The reference voltage $V_{dc\text{-}ref}$ may be based on empirical data and preprogrammed. In some example embodiments, the reference voltage $V_{dc\text{-}ref}$ may be constant and in other example embodiments, the reference voltage $V_{dc\text{-}ref}$ may change based on the input voltage to the AFE converter 1030.

The reference current $I_{Lac\text{-}ref}$ is based on a voltage tracking error (e.g., $V_{dc\text{-}ref}\text{-}V_{dc\text{-}filt}$), which allows the PIR controller 1225 to current track based on the reference current $I_{Lac\text{-}ref}$, where $I_{Lac\text{-}ref}$ is determined by the AFE controller 1200 as $$I_{Lac\_ref} = K_p \times V_{error} + K_i + \int (V_{error}) dt \tag{11}$$

where $V_{error}$ is $(V_{dc\text{-}ref}\text{-}V_{dc\text{-}filt})$, $K_p$ is the proportional gain of the PI controller 1205 and $K_i$ is the integral gain of the PI controller 1205.

The PLL controller 1210 generates a sin(θ) output based on a grid voltage $u_g$. The grid voltage grid voltage $u_g$ includes two types of information: amplitude and phase where θ is the phase information of the grid voltage $u_g$. The multiplier 1215 multiplies $I_{Lac\text{-}ref}$ by sin(θ). The subtractor 1220 determines a difference between the product generated by the multiplier and $I_{Lac}$. The difference determined by the subtractor 1220 is input to the PIR controller 1225. Using the difference determined by the subtractor 1220, the PIR 1225 generates pulse-width-modulation (PWM) signals to the AFE converter 1030. Measurements of the dc-link voltage $V_{dc}$ (voltage of DC-link 942) and the current $I_{Lac}$ are inputs into the AFE controller 1200. The notch filter 1230 filters the dc-link voltage $V_{dc}$ to generate the filtered dc-link voltage $V_{dc\text{-}filt}$.

The notch filter 1230 may be used to reduce a sensitivity of the controller 1200 to the output double line-frequency ripples. In at least some example embodiments, a transfer function of the notch filter 1230 is $$\text{Notch}(s) = \frac{s^2 + 2\omega_{filt}\xi_2 s + \omega_{filt}^2}{s^2 + 2\omega_{filt}\xi_1 s + \omega_{filt}^2}. \tag{12}$$

where $\omega_{filt}$ is a notch frequency (e.g., 120 Hz), and are damping ratios.

A depth and a width of the notch filter 1230 are controlled by the selection of the damping ratios $\xi_1$ and $\xi_2$. The damping ratios and may be determined based on a desired width and depth of the notch filter 1230.

The PLL controller 1210 is used to obtain phase information of the AC grid voltage. This permits the reference AC current $I_{Lac\text{-}ref}\cdot\sin(\theta)$ to be in phase with the grid voltage by multiplying $I_{Lac\text{-}ref}$ by sin(θ) for the unity power factor control.

The proportional-integral-resonant (PIR) controller 1225 is used to track the reference AC current $I_{Lac\text{-}ref}\cdot\sin(\theta)$ (e.g., a 60 Hz current), as the resonant control term of the PIR controller 1225 may increase a controller gain at the resonant frequency, and thus, the tracking error at the resonant frequency will be reduced.

A transfer function of the PIR controller 1225 is $$PIR(s) = K_p + \frac{K_i}{s} + \frac{K_r \omega_{res} s}{s^2 + 2\xi_{res}\omega_{res} s + \omega_{res}^2} \tag{13}$$

where $K_p$ and $K_i$ are gains of the PIR controller 1225, $K_r$ is the gain of the resonant term, $\omega_{res}$ is the resonant frequency, which is 60 Hz in the PIR controller 1225 and $\xi_{res}$ is the damping ratio of the resonant term. The gains $K_p$, $K_i$ and $K_r$ and the damping ratio $\xi_{res}$ are determined based on empirical data and/or frequency-domain design techniques such as stability margin analysis.

At the resonant frequency, the controller 915 determines the gain of the resonant term res, so $K_r/2\xi_{res}$, both decreasing the damping ratio $\xi_{res}$ or increasing the gain $K_r$ may improve the tracking accuracy.

In the cascaded control structure as described with reference to FIG. 4A, a power factor can be controlled by adding an offset on the grid phase information sin(θ). Then, the reference AC current $I_{Lac\text{-}ref}\cdot\sin(\theta)$ will be shifted. For example, by adding 30 degrees phase offset to the output of the PLL controller 1210, the power factor can be changed to 0.866.

The AFE controller 1200 implements a variable AFE output voltage scheme to help the converter 1040 narrow down an operating frequency range. A variable AFE reference voltage scheme is discussed in Li et al, "A 300-kHz 6.6-kW SiC Bidirectional LLC Onboard Charger," in IEEE Transactions on Industrial Electronics, vol. 67, no. 2, pp. 1435-1445, February 2020, doi: 10.1109/TIE.2019.2910048, the entire contents of which are hereby incorporated by reference.

As the battery voltage is changed from 300 V to 400 V, depending on the state of charge (SOC), the reference output voltage $V_{dc\text{-}ref}$ of the AFE converter 1030 is also changed from 480 V to 650 V based on the power source voltage $V_{bat1}$. Thus, the converter 1040 may deal with an almost constant input and output voltage ratio, ignoring the voltage ripples, and the operating switching frequency range can be narrowed down accordingly.

Figure 4B:
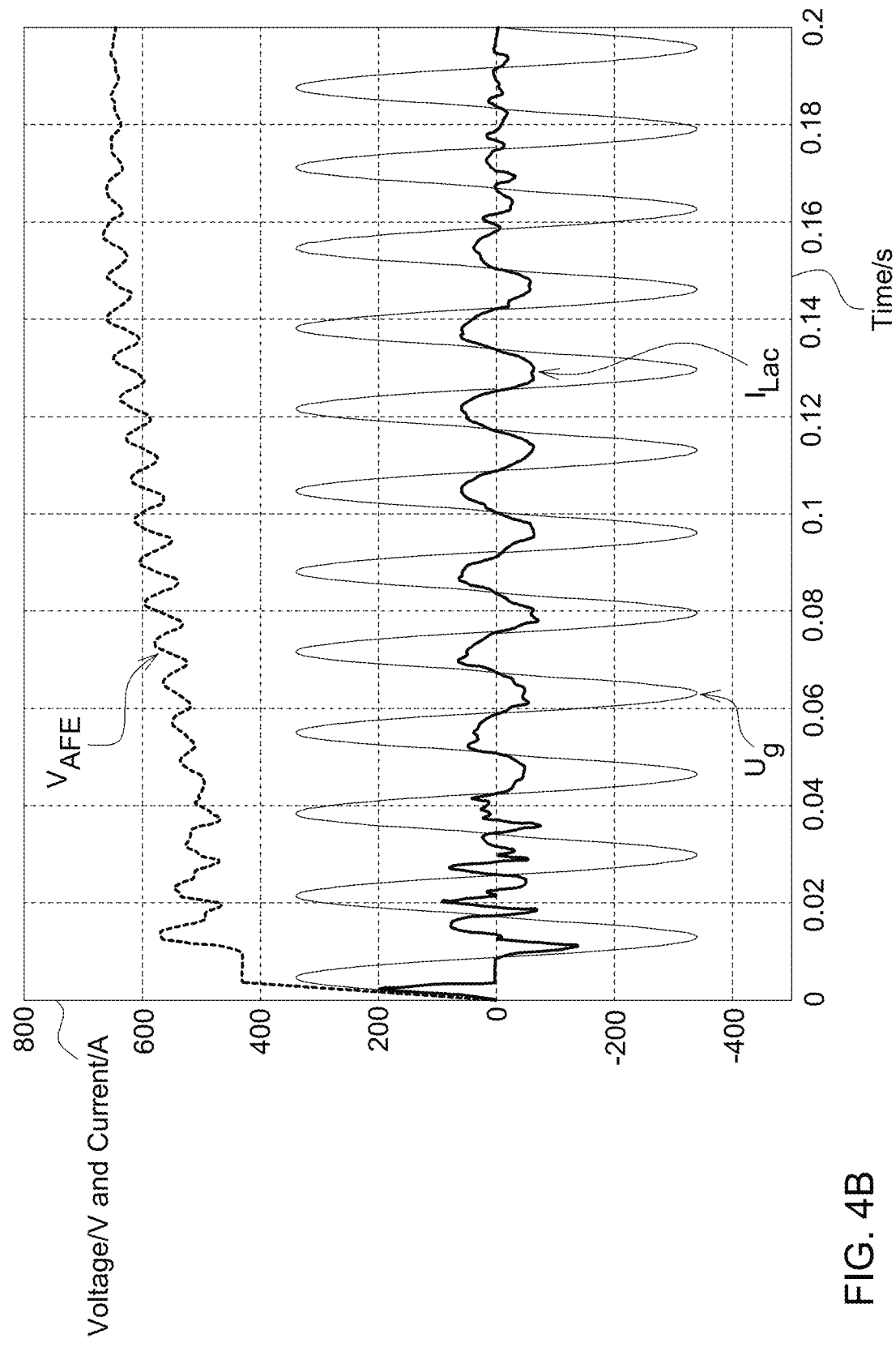

FIG. 4B illustrates a timing diagram of the output voltage $V_{AFE}$, the current $I_{Lac}$ and $u_g$, according to an example embodiment. As shown, a variable AFE output voltage $V_{AFE}$ is implemented.

Figure 5A:
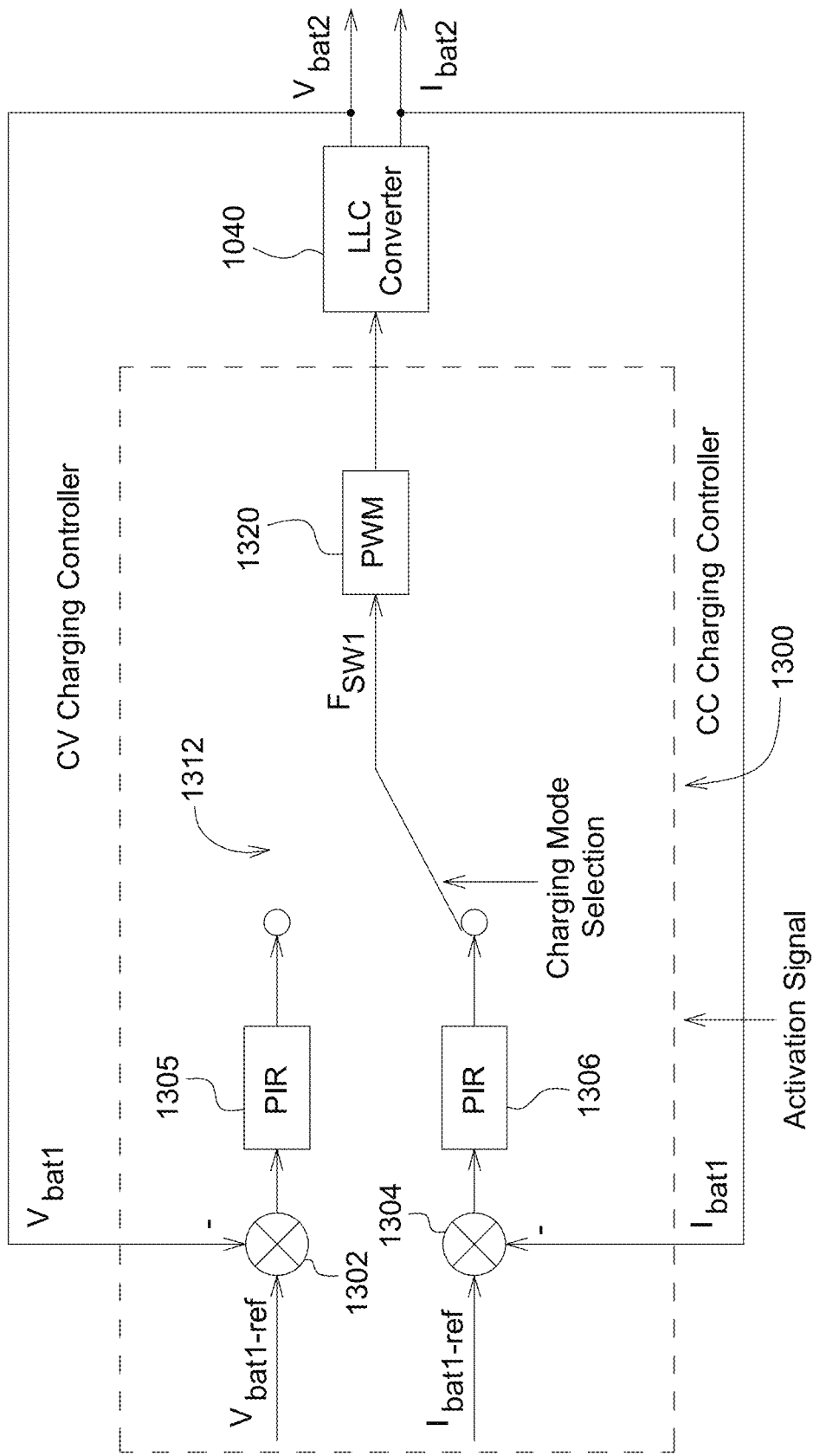
FIGS. 5A-5B illustrate at least one example embodiment of a controller for a DC/DC converter.
Figure 5B:
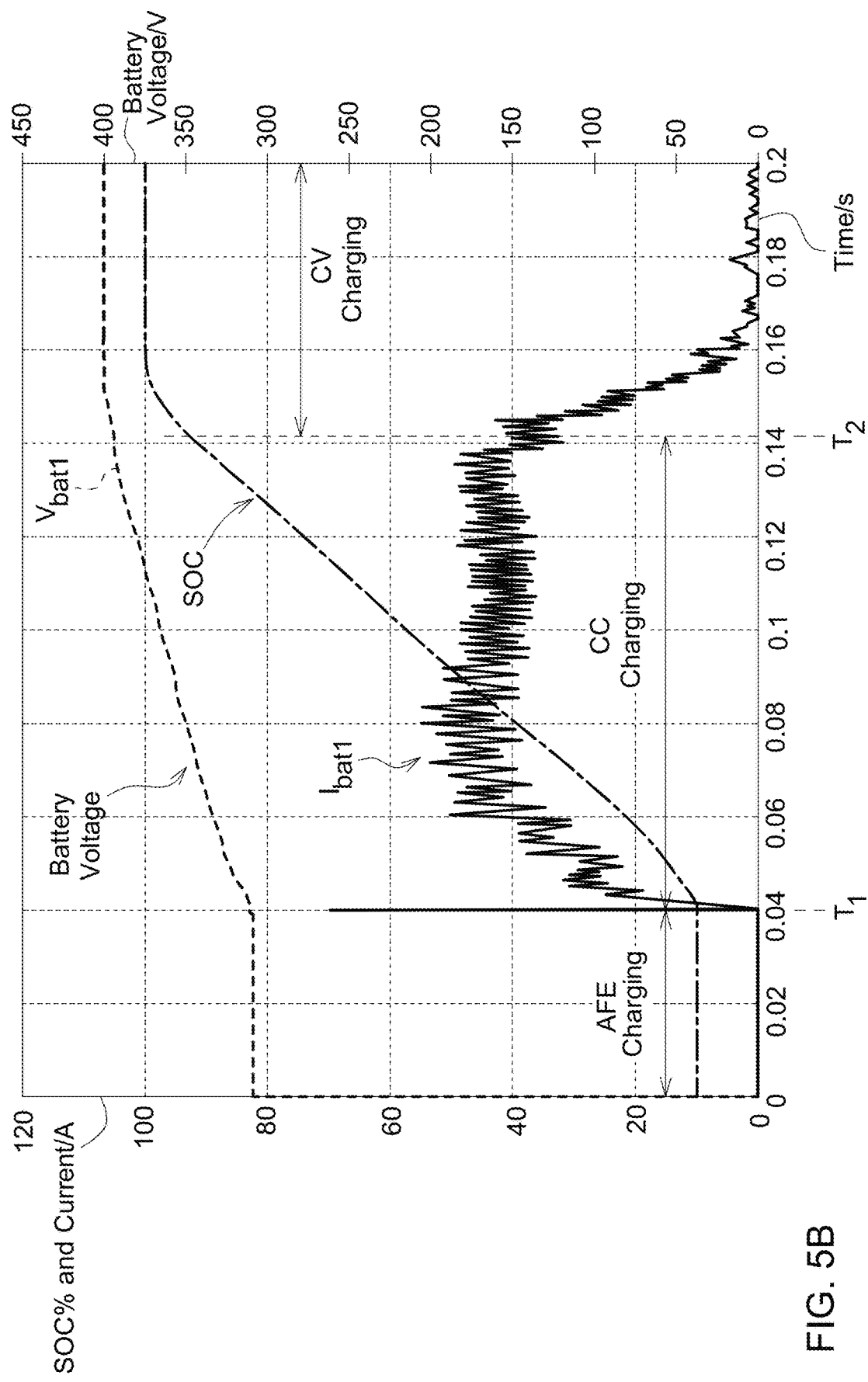

FIGS. 5A-5B illustrate at least one example embodiment of a controller for the converter 1040.

As shown in FIG. 5A, the converter controller 1300 includes a subtractor 1302, a subtractor 1304, a PIR controller 1305, a PIR controller 1310, a switch 1312 and a pulse-frequency modulation (PFM) generator 1320. The converter controller 1300, including the subtractor 1302, the subtractor 1304, the PIR controller 1305, the PIR controller 1310, the switch 1312 and the PFM generator 1320 may be implemented as hardware, such as a processor, firmware or hardware executing software as a special purpose machine.

When the converter controller 1300 is hardware, such hardware may include one or more Central Processing Units (CPUs), digital signal processors (DSPs), application-specific-integrated-circuits (ASICs), field programmable gate arrays (FPGAs) computers or the like configured as special purpose machines to perform the functions of the subtractor 1302, the subtractor 1304, the PIR controller 1305, the PIR controller 1310, the switch 1312 and the PFM generator 1320. CPUs, DSPs, ASICs and FPGAs may generally be referred to as processors and/or microprocessors.

The converter controller 1300 may operate as a constant voltage (CV) charging controller or a constant current (CC) charging controller based on a charging mode selection signal. As will be shown and described with reference to FIG. 5B, the converter controller 1300 may operate in one of the CV or CC mode based on a state-of-charge (SOC) of the power supply 950. For example, when the SOC is relatively low (e.g., less than 90%), the CC mode is used to charge the power supply 950 with a constant charging current. When the state-of-charge is relatively high (e.g., above 90%), CV mode may be used.

In the CV mode, the subtractor 1302 determines a difference between a power source reference voltage $V_{bat1\text{-}ref}$ and the converter output voltage $V_{bat1}$. The power source reference voltage $V_{bat1\text{-}ref}$ may be equal to (or substantially similar) to a battery open-circuit voltage when the battery state-of-charge is 100%, i.e., fully charged.

The PIR controller 1305 generates a switching frequency $F_{SW1}$ (described above with reference to FIG. 3) based on the difference determined by the subtractor 1302 and applies the switching frequency $F_{SW1}$ to the PFM generator 1320. The PFM generator 1320 generates the top side gate signal $G_{top1}$ (as described above and shown in FIG. 3). It should be understood that the gate signal to control the bottom side of the switch package (e.g., 1012c2) may be in a complementary mode with respect to the top side gate signal $G_{top1}$. During a deadtime both the top side gate signal $G_{top1}$ and the gate signal to control the bottom side of the switch package are off (e.g., 0 V or logic low).

In the CC mode, the subtractor 1304 determines a difference between a power source reference current $I_{bat1\text{-}ref}$ and the converter output current $I_{bat1}$. The power source reference current $I_{bat1\text{-}ref}$ may be a set value and based on a datasheet of the power supply 950. The PIR controller 1310 generates the switching frequency $F_{SW1}$ based on the difference determined by the subtractor 1304 and applies the switching frequency $F_{SW1}$ to the PFM 1320. The PFM generates the top side gate signal $G_{top1}$ (as described above and shown in FIG. 3).

The PIR controllers 1305, 1310 are used to provide voltage tracking and current tracking, respectively. The PIR controllers 1305, 1310 receive a voltage tracking error ($V_{bat1\text{-}ref}\text{-}V_{bat1}$) and a current tracking error ($I_{bat1\text{-}ref}\text{-}I_{bat1}$), respectively, then generate a corresponding switching frequency $F_{SW}$ to reduce the tracking error and attempt to remove the tracking error.

In both the CC and CV modes, the PFM generator 1320 applies the top side gate signal $G_{top1}$ as well as the gate signal to control the bottom side of the switch package to the converter 1040.

The power source reference current $I_{bat1\text{-}ref}$ and the power source reference voltage $V_{bat1\text{-}ref}$ signals, as well as the charging mode selection signal, may be obtained from a battery-management-system (BMS). An example BMS includes AN1086 Orion BMS, but is not limited thereto.

As described earlier with reference to FIG. 3, the converter 1040 may operate in the DCM mode, and the voltage relationship between the input and output voltages is nonlinear. In some example embodiments, the controller 1300 uses a feedforward term to improve a dynamic response of the converter 1040 and compensate for the nonlinearity.

The output voltage of AFE converter 1030, i.e., the input voltage of the converter 1040, may contain double line-frequency ripples.

In the converter controller 1300, the PIR controllers 1305 and 1310 are used to attenuate an impact of input double line-frequency voltage ripples, and the resonant frequency of the controller 1300 is set as the double line-frequency (e.g. 120 Hz) to reject the input voltage ripple.

The converter controller 1300 operates based on an activation signal and the mode signal generated by the controller 915. More specifically, and as shown in FIG. 5B, the controller 915 monitors the voltage $V_{dc}$ across the DC-link 942 using a voltage sensor 298. The controller 915 controls the AFE converter 1030 to charge the DC-link 942. Once the controller 915 determines the voltage $V_{dc}$ reaches a threshold level (e.g., becomes relatively stable) in the charging mode, the controller 915 generates the activation signal to enable the converter 1040 to operate and charge the power source 950.

FIG. 5B illustrates an operation of the vehicle system 900 in the charging mode. In FIG. 5B, the vehicle system 900 operates in an AFE charging period until a time $T_1$ (e.g., when the DC-link voltage $V_{dc}$ reaches a threshold level). During the AFE charging period, the AFE converter 1030 generates a voltage at the DC-link 942. During the AFE charging period, there may be no current flowing from the converters 1040 and 952 into the power supplies 950 and 954.

At $T_1$, the converter controller 1300 causes the converter 1040 to operate in a CC mode. The AFE converter 1030 may continue to operate in a same manner to maintain the DC-link voltage $V_{dc}$.

This causes the current $I_{bat1}$ be generated which charges the power source 950 (shown by the increasing power source voltage $V_{bat1}$).

At $T_2$, the converter 1040 switches to the CV mode when the SOC reaches a threshold percentage. For example, a voltage sensor may provide feedback to the controller 1300, and the SOC can be calculated based on the battery terminal voltage measured through the voltage sensor. The controller 1300 may generate the charging mode selection signal (shown in FIG. 5A) based on whether the SOC exceeds the threshold level. In an example embodiment, the threshold of the SOC may be 95%.

The CV mode causes the current $I_{bat1}$ to decrease such that the power source voltage $V_{bat1}$ remains constant.

Figure 6A:
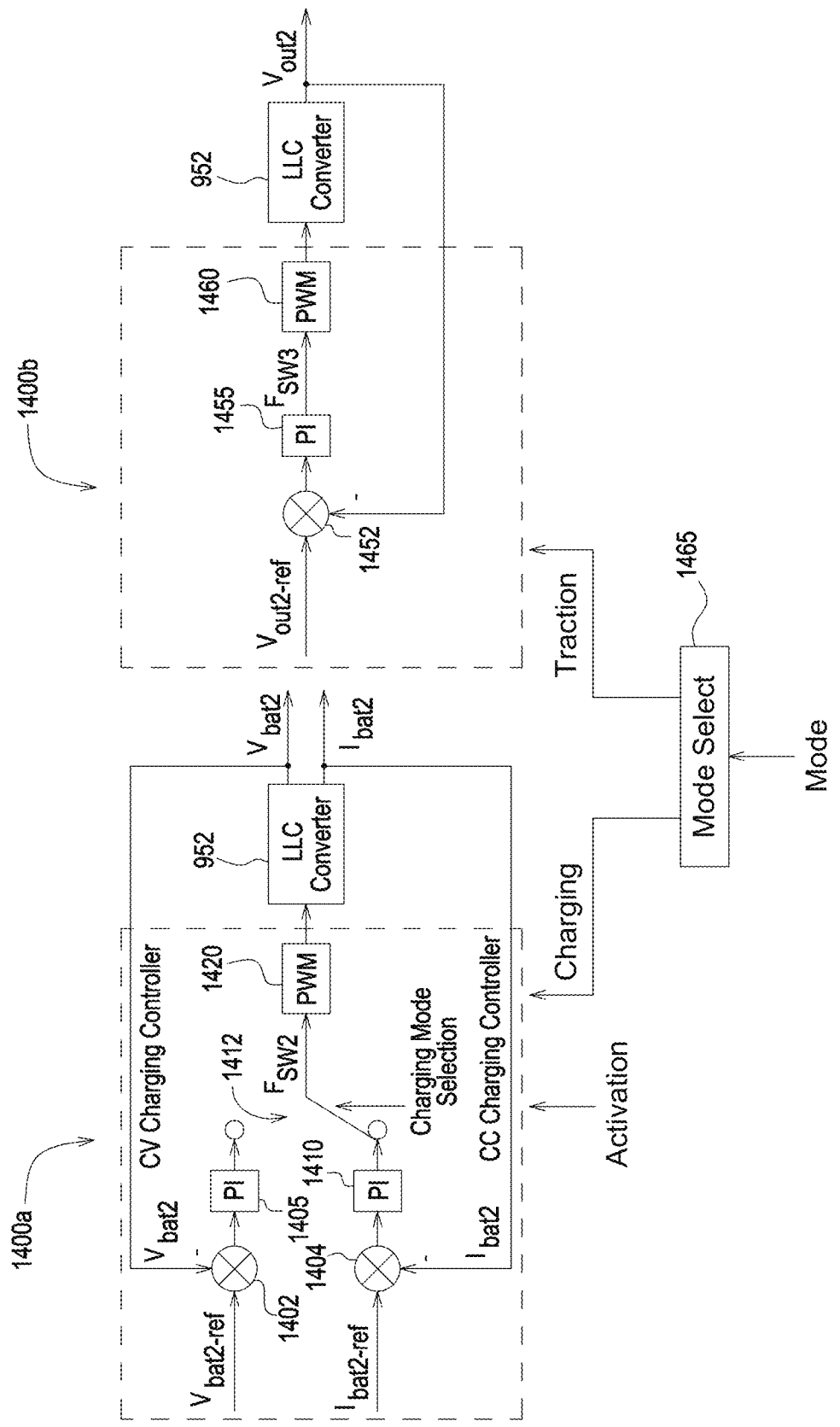
Figure 6B:
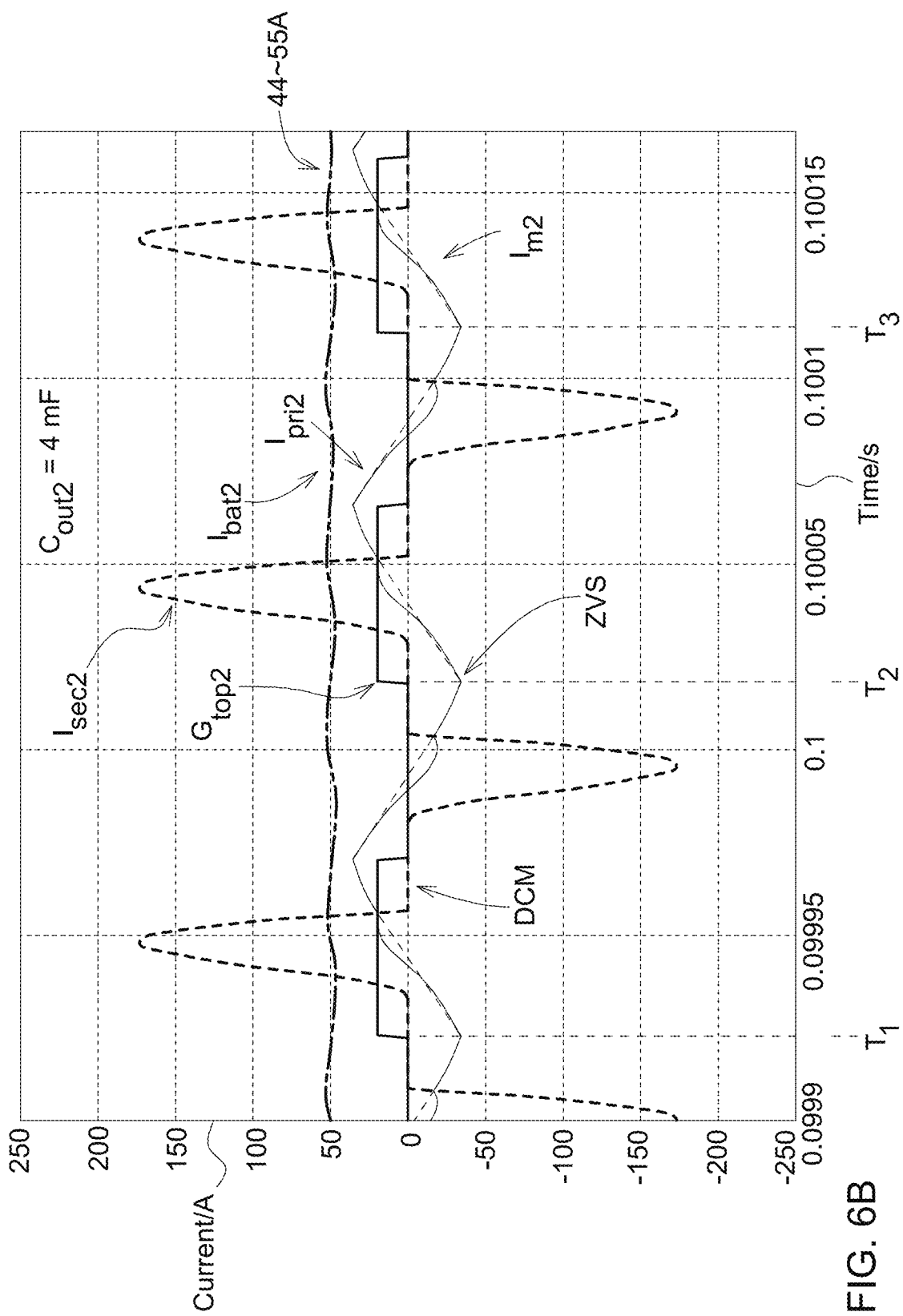
Figure 6C:
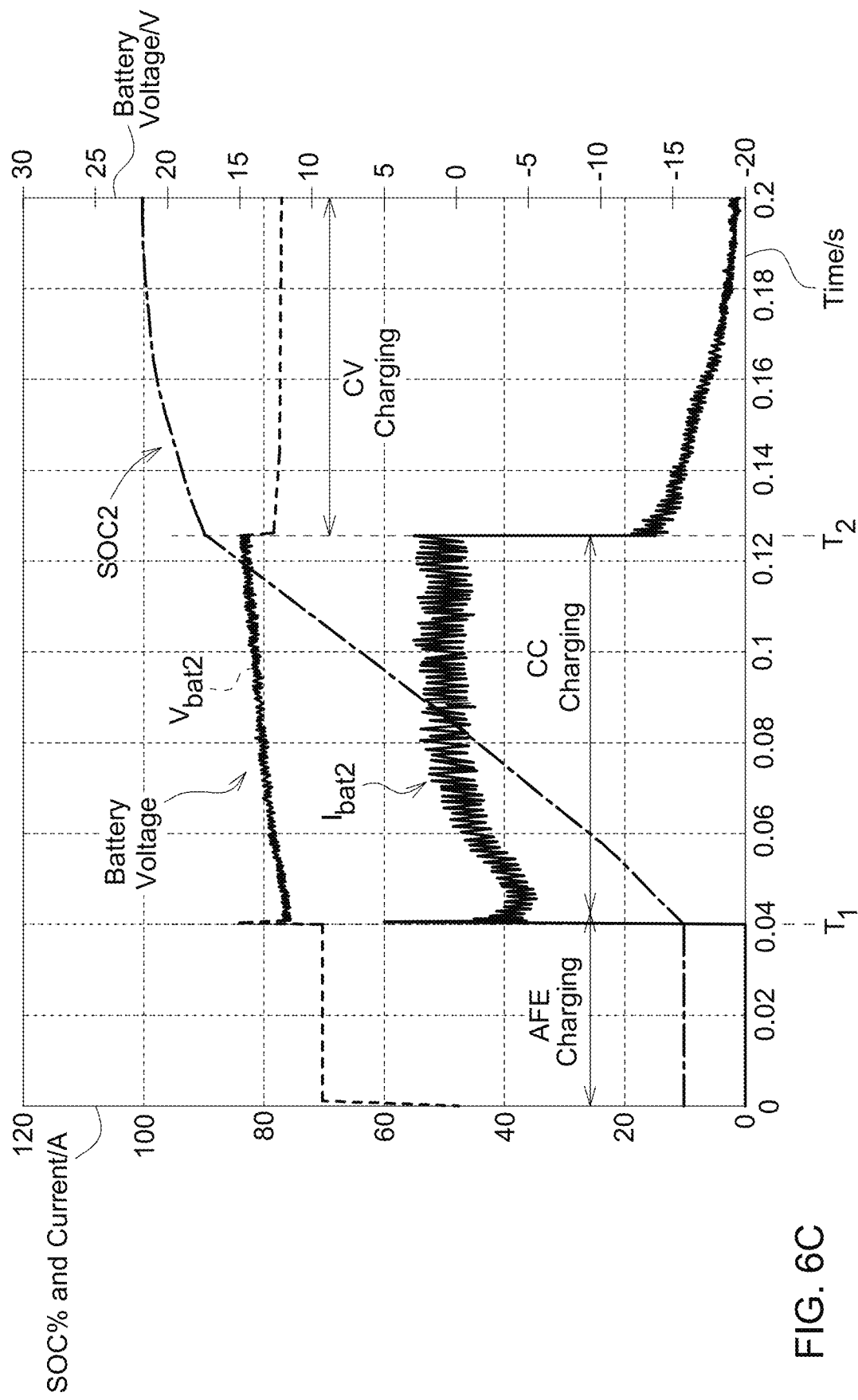

FIGS. 6A-6C illustrate at least one example embodiment of a controller for the converter 952.

The converter controller 1400 includes a charging portion 1400a and a traction portion 1400b.

As shown in FIG. 6A, the charging portion 1400a includes a subtractor 1402, a subtractor 1404, a PI controller 1405, a PI controller 1410, a switch 1412 and a pulse-frequency modulation (PFM) generator 1420. The charging portion 1400a, including the subtractor 1402, the subtractor 1404, the PI controller 1405, the PI controller 1410, the switch 1412 and the PFM generator 1420 may be implemented as hardware, such as a processor, firmware or hardware executing software as a special purpose machine.

When the charging portion 1400a is hardware, such hardware may include one or more Central Processing Units (CPUs), digital signal processors (DSPs), application-specific-integrated-circuits (ASICs), field programmable gate arrays (FPGAs) computers or the like configured as special purpose machines to perform the functions of the subtractor 1402, the subtractor 1404, the PI controller 1405, the PI controller 1410, the switch 1412 and the PFM generator 1420. CPUs, DSPs, ASICs and FPGAs may generally be referred to as processors and/or microprocessors.

The traction portion 1400b includes a subtractor 1452, a PI controller 1455 and a PFM 1460. The PFM 1460 may be the same as the PFM generator 1420. The traction portion 1400b, including the subtractor 1452, the PI controller 1455 and the PFM 1460 may be implemented as hardware, such as a processor, firmware or hardware executing software as a special purpose machine.

When the traction portion 1400b is hardware, such hardware may include one or more Central Processing Units (CPUs), digital signal processors (DSPs), application-specific-integrated-circuits (ASICs), field programmable gate arrays (FPGAs) computers or the like configured as special purpose machines to perform the functions of the subtractor 1452, the PI controller 1455 and the PFM 1460. CPUs, DSPs, ASICs and FPGAs may generally be referred to as processors and/or microprocessors.

The converter controller 1400 further includes a selection circuit 1465 that selects one of the charging portion 1400a and the traction portion 1400b based on the model signal. When the mode signal indicates a charging mode, the converter controller 1400 activates the charging portion 1400a when the activation signal indicates a CC or CV mode (e.g., when the DC-link voltage $V_{dc}$ reaches a threshold level). When the mode signal indicates a traction mode, the converter controller 1400 activates the traction portion 1400b when the mode signal indicates the traction mode.

The converter controller 1400 may operate as a constant voltage (CV) charging controller or a constant current (CC) charging controller in the charging mode based on a charging mode selection signal. As will be shown and described with reference to FIG. 6B, the converter controller 1400 may operate in one of the CV or CC mode based on a state-of-charge (SOC) of the power supply 954. For example, when the SOC is relatively low (e.g., less than 90%), the CC mode is used to charge the power supply 954 with a constant charging current. When the state-of-charge is relatively high (e.g., above 90%), CV mode may be used.

In the CV mode, the subtractor 1402 determines a difference between a power source reference voltage $V_{bat2-ref}$ and the converter output voltage $V_{bat2}$. The power source reference voltage $V_{bat2-ref}$ may be equal to (or substantially similar) to a battery open-circuit voltage when the battery state-of-charge is 100%, i.e., fully charged.

In the CV mode, the switch 1412 operationally connects the PI controller 1405 to the PFM generator 1420.

The PI controller 1405 generates a switching frequency $F_{SW2}$ (determined in accordance with the description above with reference to FIG. 3) based on the difference determined by the subtractor 1402 and applies the switching frequency $F_{SW2}$ to the PFM generator 1420. The PFM generator 1420 generates a top side gate signal $G_{top2}$ (as described above and shown in FIG. 6B).

In the CC mode, the switch 1412 operationally connects the PI controller 1410 to the PFM generator 1420.

The subtractor 1404 determines a difference between a power source reference current $I_{bat2-ref}$ and the converter output current $I_{bat2}$. The power source reference current $I_{bat2-ref}$ may be a set value and based on a datasheet of the power supply 954. The PI controller 1410 generates the switching frequency $F_{SW2}$ based on the difference determined by the subtractor 1404 and applies the switching frequency $F_{SW2}$ to the PFM generator 1420. The PFM generator 1420 generates the top side gate signal $G_{top2}$ (as described above and shown in FIG. 6B).

The PI controllers 1405, 1410 are used to provide voltage tracking and current tracking, respectively. The PI controllers 1405, 1410 receive a voltage tracking error ($V_{bat2-ref}$-$V_{bat2}$) and a current tracking error ($I_{bat2-ref}$-$I_{bat2}$), respectively, then generate a corresponding switching frequency $F_{SW2}$ to reduce the tracking error and attempt to remove the tracking error.

In both the CC and CV modes, the PFM generator 1420 applies the top side gate signal $G_{top2}$ to the converter 952. The PFM generator 1420 generates the top side gate signal $G_{top2}$ (as shown in FIG. 6B). It should be understood that the gate signal to control the bottom side of the switch package (e.g., 1060b) may be in a complementary mode with respect to the top side gate signal $G_{top2}$. During a deadtime both the top side gate signal $G_{top2}$ and the gate signal to control the bottom side of the switch package are off (e.g., 0 V or logic low).

The power source reference current $I_{bat2-ref}$ and the power source reference voltage $V_{bat2-ref}$ signals, as well as the charging mode selection signal, may be obtained from a battery-management-system (BMS). An example BMS includes AN1086 Orion BMS, but is not limited thereto.

FIG. 6B illustrates current waveforms of the converter 952 according to at least one example embodiment. A power source current $I_{bat2}$ is a power source current of the power supply 954, a magnetizing current $I_{m2}$ is the magnetizing current of the transformer 1054, the primary side current $I_{pri2}$ is the primary side current of the transformer 1054 and the secondary side current $I_{sec2}$ is the secondary side current of the transformer 1054. The gate signal $G_{top2}$ controls the transistor of the high side switch package 1060a. ZVS occurs at times $T_1$, $T_2$ and $T_3$, for example.

Similar to the converter 1040 and as described earlier with reference to FIG. 3, the converter 952 may operate in the DCM mode, and the voltage relationship between the input and output voltages is nonlinear. In some example embodiments, the controller 1400 uses a feedforward term to improve a dynamic response of the converter 952 and compensate for the nonlinearity.

The charging portion 1400a operates based on the activation and mode signals generated by the controller 915. More specifically, and as shown in FIG. 6C, the controller 915 monitors the voltage $V_{dc}$ across the DC-link 942 using the voltage sensor 298. The controller 915 controls the AFE converter 1030 to charge the DC-link 942. Once the controller 915 determines the voltage $V_{dc}$ reaches a threshold level (e.g., becomes relatively stable) in the charging mode, the controller 915 generates the activation signal to enable both the converter 1040 and the converter 952 to operate and charge the power supply 954.

FIG. 6C illustrates an operation of the vehicle system 900 in the charging mode. In FIG. 6C, the vehicle system 900 operates in an AFE charging period until a time $T_1$ (e.g., when the DC-link voltage $V_{dc}$ reaches a threshold level). During the AFE charging period, the AFE converter 1030 generates a voltage at the DC-link 942. During the AFE charging period, there may be no current flowing from the converters 1040 and 952 into the power supplies 950 and 954.

At $T_1$, the converter controller 1400 causes the converter 952 to operate in a CC mode. The AFE converter 1030 may continue to operate in a same manner to maintain the DC-link voltage $V_{dc}$, and the converter 1040 maintains the DC output voltage across the capacitor $C_{out1}$, which is the input voltage of the converter 952.

This causes the current $I_{bat2}$ to be generated which charges the power source 950 (shown by an increasing power source voltage $V_{bat2}$).

At $T_2$, the converter 952 switches to the CV mode when the SOC reaches a threshold percentage. For example, a voltage sensor may provide feedback to the controller 1400, and the SOC can be calculated based on the battery terminal voltage measured through the voltage sensor. The controller 1400 may generate the charging mode selection signal (shown in FIG. 6A) based on whether the SOC exceeds the threshold level. In an example embodiment, the threshold of the SOC may be 95%.

The CV mode causes the current $I_{bat2}$ to decrease such that the power source voltage $V_{bat2}$ remains constant.

Referring back to FIG. 1B, when the controller 905 controls the contactor control circuit 910 to be in the traction mode, each switch package 84 is switched on and off to generate the three phases from the DC-link 942 to the motor 920. For example, the switch packages 84 of the inverter 940 are switched on and off to generate the three phases for the motor 920. The DC/DC output stage 945 and the filter 935 become operably disconnected from the inverter 940 with the exception of the output capacitor $C_{out1}$. The first end of the capacitor $C_{out1}$, the first end of the inductor Lbat1, a positive terminal of the power supply 950, and the high side switch package 84 of the converter 952 become connected to a high side rail of the inverter 940 at a node N6. In addition a first end of the inductor $L_{r2}$, a negative terminal of the power supply 950, and the low side switch package 84 of the converter 952 become connected to a low side rail of the inverter 940 at a node N7.

Example embodiments being thus described, the same may be varied in many ways. Such variations are not to be regarded as a departure from the spirit and scope of example embodiments, and all such modifications as would be obvious to one skilled in the art are intended to be included within the scope of the claims.

What is claimed is:

1. A system comprising:
   an inverter configured to operate in at least one of a charging mode or a drive mode;
   a cascaded direct current (DC)-DC converter, the cascaded DC-DC converter including
      a first portion of the inverter, the first portion of the inverter including a half-bridge,
      a first DC-DC converter including
         a first portion of the first DC-DC converter, the first portion of the first DC-DC converter being a single active bridge, the single active bridge being a half-bridge for active switching control, and
         a second portion of the first DC-DC converter, the second portion of the first DC-DC converter being a first portion of the cascaded DC-DC converter,
      a second DC-DC converter; and
      at least one controller configured to, selectively couple, via at least one first switch, the first portion of the inverter to the first portion of the cascaded DC-DC converter during the charging mode, the first portion of the cascaded DC-DC converter including two passive bridges, the two passive bridges being two diode bridges for rectification,
         decouple the inverter from the first portion of the cascaded DC-DC converter and selectively couple, via at least one second switch, the inverter to a second portion of the cascaded DC-DC converter during the drive mode, the second portion of the cascaded DC-DC converter including the second DC-DC converter, and
         control the single active bridge such that the single active bridge is configured to operate in accordance with zero voltage switching (ZVS).

2. The system of claim 1, wherein the first DC-DC converter is a unidirectional DC-DC converter.

3. The system of claim 1, wherein the first DC-DC converter further comprises:
   a plurality of diode bridges; and
   a transformer coupled between the plurality of diode bridges and the single active bridge.

4. The system of claim 1, further comprising:
   a first voltage source; and
   a second voltage source, wherein the first DC-DC converter is a first LLC converter having a first inductor connected in series with the first voltage source and the second DC-DC converter is a second LLC converter having a second inductor connected in series with the second voltage source.

5. The system of claim 1, wherein the at least one controller is configured to control the first portion of the inverter during the charging mode based on a DC bus reference voltage.

6. The system of claim 5, wherein the at least one controller includes a proportional-integral-resonant (PIR) controller, a proportional-integral (PI) controller, phase-locked-loop (PLL) controller and a notch filter.

7. The system of claim 1, wherein the at least one controller includes a proportional-integral-resonant (PIR) controller and a pulse-frequency-modulation (PFM) controller for the first DC-DC converter.

8. The system of claim 1 wherein the at least one controller includes a proportional-integral (PI) controller and a pulse-frequency-modulation (PFM) controller for the second DC-DC converter.

9. The system of claim 1, wherein the system comprises:
   a single-phase AC-DC converter and two cascaded DC-DC converters during the charging mode.

10. The system of claim 1, wherein the charging mode includes a constant current (CC) mode and a constant voltage (CV) mode and the at least one controller is configured to cause the system to operate in a CC mode or CV mode during the charging mode.

11. A computer-readable medium, when executed by at least one controller, configured to cause a vehicle system to,
   selectively couple, via at least one first switch, a first portion of an inverter to a first portion of a cascaded DC-DC converter during a charging mode, the first portion of the inverter including a half-bridge and the first portion of the cascaded DC-DC converter including two passive bridges and a first DC-DC converter, the two passive bridges being two diode bridges for rectification and the first DC-DC converter including
      a first portion of the first DC-DC converter, the first portion of the first DC-DC converter being a single active bridge, the single active bridge being a half-bridge for active switching control, and
      a second portion of the first DC-DC converter, the second portion of the first DC-DC converter being a first portion of the cascaded DC-DC converter, decouple the inverter from the first portion of the cascaded DC-DC converter and selectively couple, via at least one second switch, the inverter to a second portion of the cascaded DC-DC converter during a drive mode, the second portion of the cascaded DC-DC converter including a second DC-DC converter, and
   control the single active bridge such that the single active bridge is configured to operate in accordance with zero voltage switching (ZVS).

12. The computer-readable medium of claim 11, wherein when executed by the at least one controller, is configured to cause the vehicle system to execute a proportional-integral-resonant (PIR) controller, a proportional-integral (PI) controller, phase-locked-loop (PLL) controller and a notch filter.

13. The computer-readable medium of claim 11, wherein when executed by the at least one controller, is configured to cause the vehicle system to operate in one of a constant current (CC) mode or a constant voltage (CV) mode during the charging mode.

14. The system of claim 1, wherein the second portion of the cascaded DC-DC converter is not part of the inverter.

15. The system of claim 2, wherein the at least one controller is configured to selectively couple the first DC- DC converter to the inverter based on whether the inverter operates in the charging mode or the drive mode.

16. The system of claim 1, further comprising at least one sensor configured to detect a zero-crossing point of a primary side current and a secondary side current of the single active bridge.

17. The system of claim 16, further comprising an inductor connected in series between a voltage source and the inverter.

* * * * *